United States Patent
Sano

(10) Patent No.: US 7,222,693 B2
(45) Date of Patent: May 29, 2007

(54) HYDRAULIC CONTROL VALVE AND POWER STEERING APPARATUS USING THE SAME

(75) Inventor: Osamu Sano, Kashihara (JP)

(73) Assignee: KoYo Seiko Co., Ltd, Osaka-Shi (JP)

( * ) Notice: Subject to any disclaimer, the term of this patent is extended or adjusted under 35 U.S.C. 154(b) by 0 days.

(21) Appl. No.: 11/212,727

(22) Filed: Aug. 29, 2005

(65) Prior Publication Data

US 2005/0284687 A1  Dec. 29, 2005

Related U.S. Application Data

(62) Division of application No. 09/582,870, filed as application No. PCT/JP99/06690 on Nov. 29, 1999, now abandoned.

(30) Foreign Application Priority Data

Nov. 30, 1998  (JP) ................................. 10-340690

(51) Int. Cl.
*B62D 5/10* (2006.01)
(52) U.S. Cl. .................. 180/441; 137/625.21
(58) Field of Classification Search ................ 180/417, 180/421, 422, 441, 442; 91/375 A; 137/625.21, 137/625.23
See application file for complete search history.

(56) References Cited

U.S. PATENT DOCUMENTS 4,452,274 A  6/1984  Haga et al.
5,207,244 A  5/1993  Behrens et al.
5,538,095 A  7/1996  Haga et al.
5,562,124 A  10/1996  Behrens et al.
5,645,107 A  7/1997  Kobayashi et al.
5,799,693 A  9/1998  Strong
5,937,728 A  8/1999  Strong
5,954,152 A  9/1999  Kada et al.
6,119,803 A  9/2000  Suzuki et al.
6,216,815 B1  4/2001  Inaguma et al.

FOREIGN PATENT DOCUMENTS

EP  0 472 101 A1  2/1992
EP  0 719 696 A1  7/1996

(Continued)

*Primary Examiner*—Tony Winner
(74) *Attorney, Agent, or Firm*—Birch, Stewart, Kolasch & Birch, LLP

(57) ABSTRACT

The present invention provides a hydraulic control valve and a power steering apparatus using the same in which chamfer portions are provided only on throttle portions between oil supply chambers and first oil feed chambers and between the oil supply chambers and second oil feed chambers, or only throttle portions between oil discharge chambers 11 and the first oil feed chambers and between the oil discharge chambers 11 and the second oil feed chambers. With this design, even if six or more oil grooves of each of a valve body and a valve spool are disposed at equal distances from one another, when the minimum flow rate to be controlled is reduced as small as possible, a distribution amount for one portion where the flow rate is controlled can be doubled as compared with a conventional structure, it is possible to stabilize the hydraulic characteristics in a region where the flow rate to be controlled is minimum, and to eliminate the discontinuity of the hydraulic characteristics.

28 Claims, 12 Drawing Sheets

FOREIGN PATENT DOCUMENTS

| | | |
|---|---|---|
| EP | 0 846 609 A2 | 6/1998 |
| EP | 0 854 074 A2 | 7/1998 |
| EP | 0 949 137 A2 | 10/1999 |
| GB | 2 112 332 A | 7/1983 |
| JP | 58 188752 A | 11/1983 |
| JP | 5911969 A | 1/1984 |
| JP | 03 90475 | 4/1991 |
| JP | 939814 A | 2/1992 |
| JP | 06 156 292 | 6/1994 |
| JP | 8 104246 A | 4/1996 |
| JP | 10-175557 | 6/1998 |
| JP | 2000 85599 | 3/2000 |

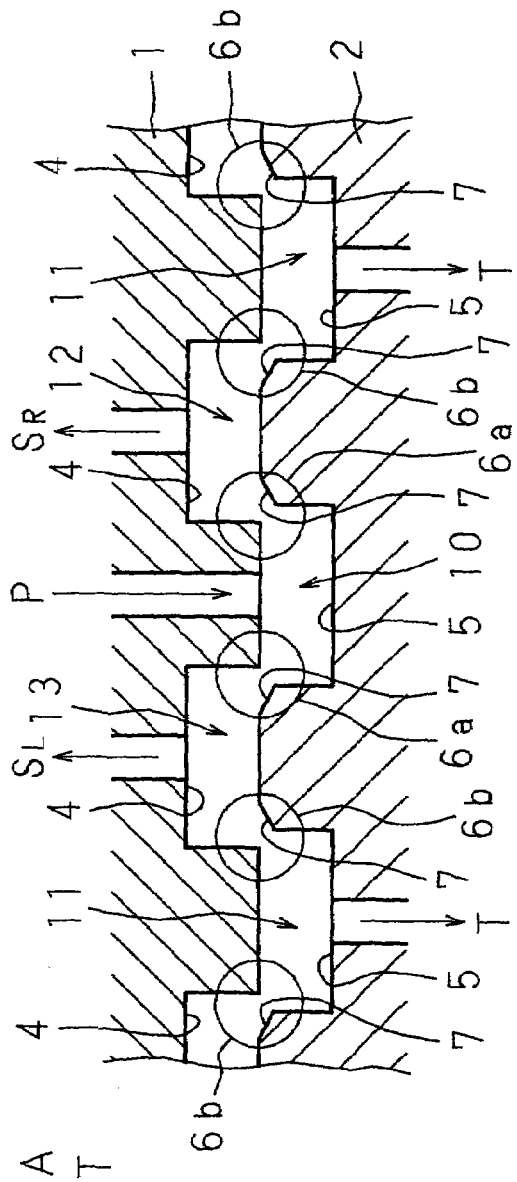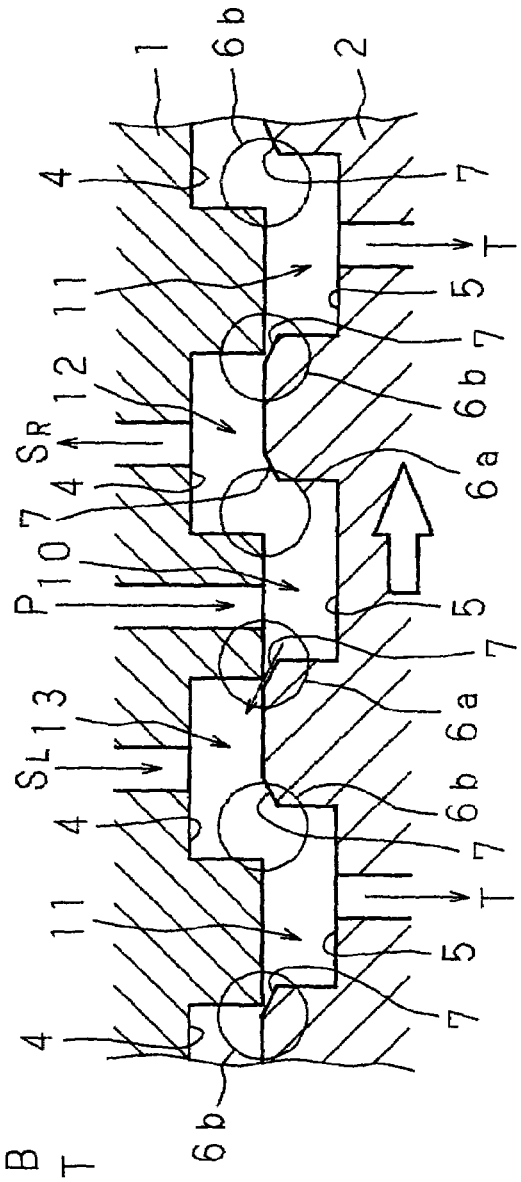
FIG. 3A
PRIOR ART
FIG. 3B
PRIOR ART

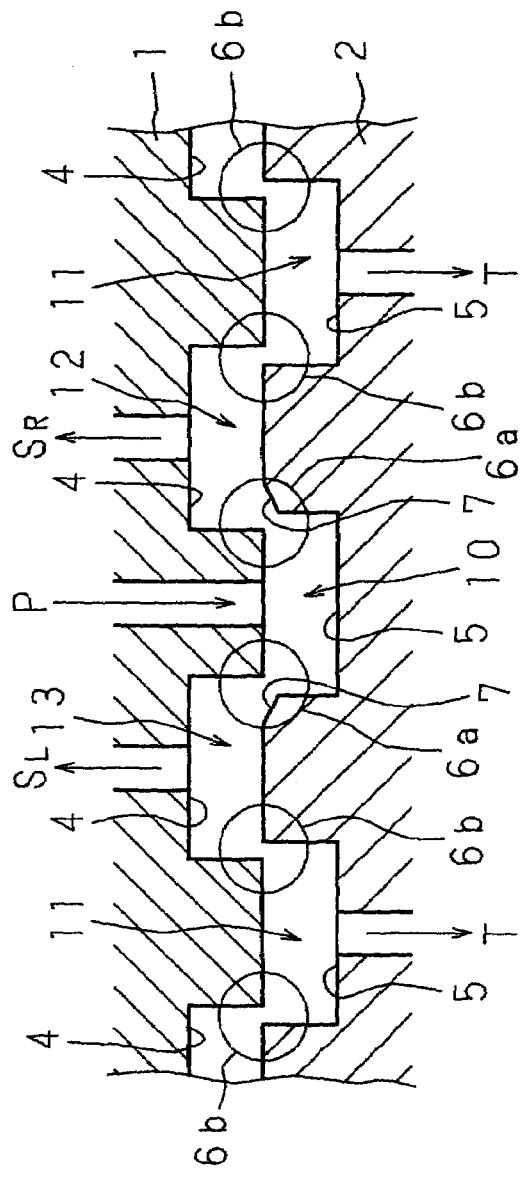
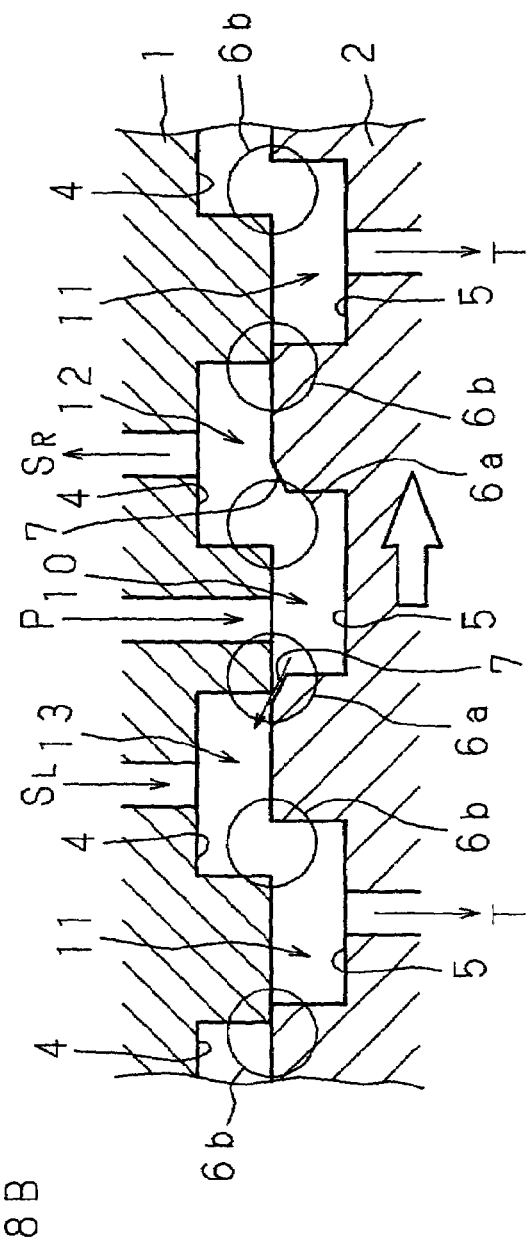
FIG. 8A
FIG. 8B

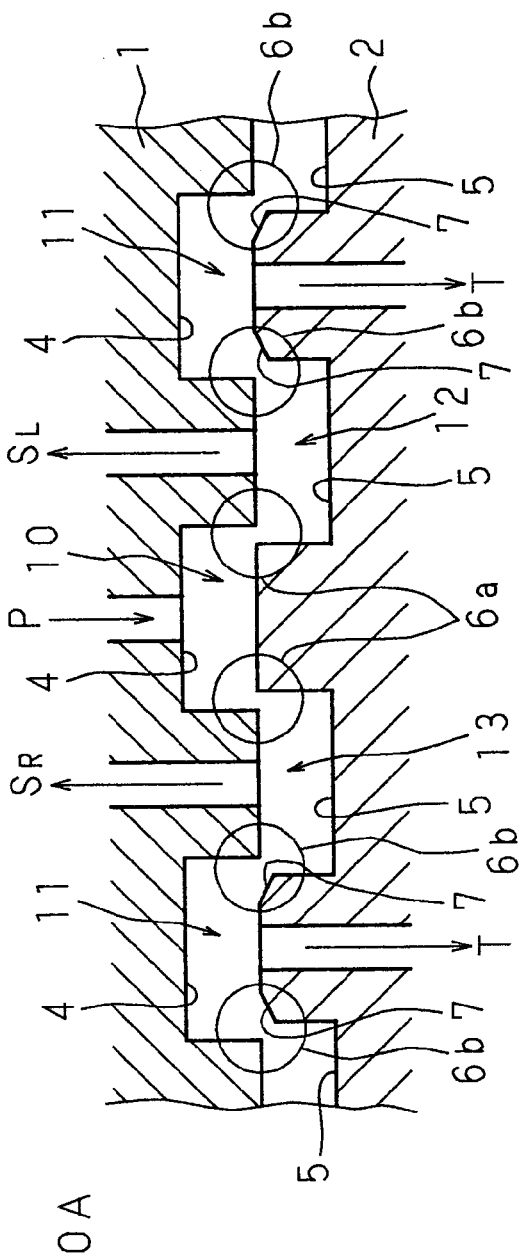
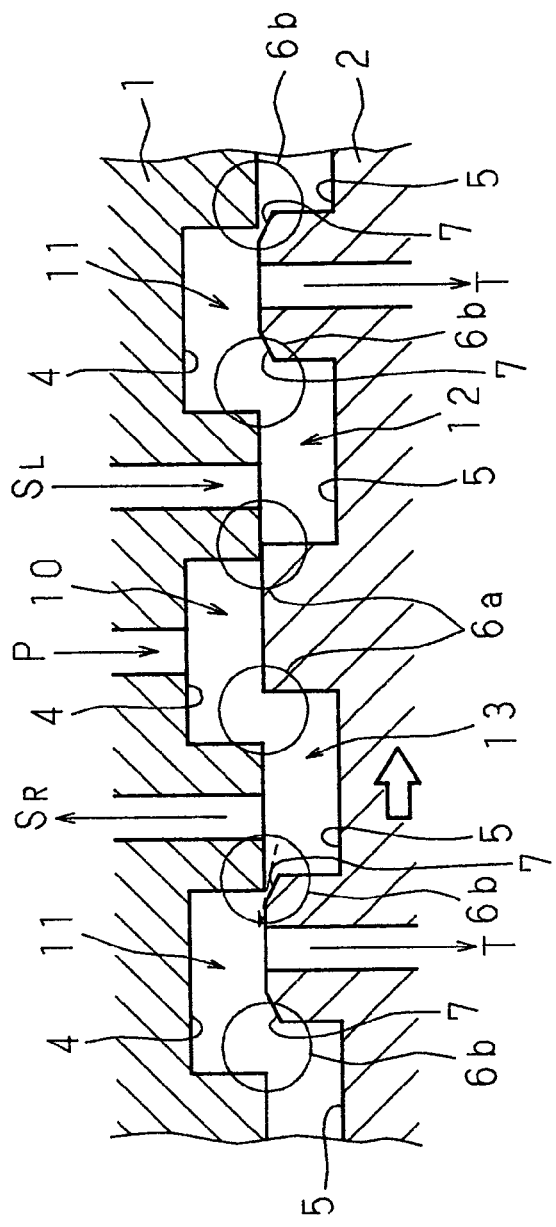
FIG. 10A
FIG. 10B

HYDRAULIC CONTROL VALVE AND POWER STEERING APPARATUS USING THE SAME

This application is a Divisional of application Ser. No. 09/582,870 filed on Jul. 6, 2000 now abandoned, and for which priority is claimed under 35 U.S.C. § 120. Application Ser. No. 09/582,870 is the national phase of PCT International Application No. PCT/JP99/06690 filed on Nov. 29, 1999 under 35 U.S.C. § 371. The entire contents of each of the above-identified applications are hereby incorporated by reference. This application also claims priority of application Ser. No. 10/340690 filed in Japan on Nov. 30, 1998 under 35 U.S.C. § 119.

FIELD OF THE INVENTION

The present application is directed to a power steering apparatus in which the conventional hydraulic control valve of the above-described structure is used, a hydraulic pump is standby controlled (low-speed rotation or zero-speed rotation), and when a steering torque is not applied to a steering wheel at the time of idling or the like, the small or zero flow rate of pressurized oil about 1 to 2 liter/min is introduced into the oil supply chamber of the hydraulic control valve, the steering angle of the steering wheel is detected, and the flow rate of oil of the hydraulic pump can be increased in accordance with the steering angular velocity based on the detected steering angle. According to such a power steering apparatus, it is possible to abruptly change the flow rate to be controlled of the hydraulic control valve from the small flow rate as small as possible or zero flow rate to high flow rate as compared with the conventional small flow rate.

BACKGROUND ART

In a hydraulic power steering apparatus which assists the steering operation by hydraulic force generated by a plurality of hydraulic cylinders (power cylinders) disposed in the steering apparatus for reducing labor required for the operation of a steering wheel, a hydraulic control valve for controlling supply and discharge of oil pressure in accordance with direction and magnitude of a steering torque applied to the steering wheel is disposed between, a hydraulic pump driven by an electric motor and a hydraulic tank for accommodating operating oil and the hydraulic cylinders, and pressurized oil generated by the hydraulic pump is supplied to two cylinder chambers of the hydraulic cylinders by the operation of the hydraulic control valve.

As for the hydraulic control valve, a rotary-type hydraulic control valve directly utilizing the rotation of the steering wheel is used. In this rotary hydraulic control valve, an input shaft connected to the steering wheel and an output shaft connected to the steering mechanism are coaxially connected to each other through a torsion bar, a valve spool integrally formed with one of the connected ends is coaxially and relatively rotatably fitted into a cylindrical valve body engaged with the other connected end, and when the steering torque is applied to the steering wheel, the torsion bar is twisted and relative angular displacement is generated between the valve body and the valve spool.

FIG. 1 is a schematic transverse sectional view showing one example of a structure of a conventional hydraulic control valve described in Japanese Patent Application Laid-open No. H9-39814 (1997), and FIG. 2 is a schematic transverse sectional view showing another example of the structure of the conventional hydraulic control valve described in Japanese Patent Application Laid-open No. H9-39814 (1997).

In FIGS. 1 and 2, a plurality of first oil grooves 4 extending in the longitudinal direction are disposed along the circumferential direction in an inner peripheral surface of a valve body 1. A plurality of second oil grooves 5, 5, . . . are alternatively disposed in an outer peripheral surface of a valve spool 2 with respect to the first oil grooves 4, 4, . . . .

In the example shown in FIG. 1, the first oil grooves 4, 4, . . . parallelly arranged in the inner peripheral surface of the valve body 1 form first oil feed chambers 12, 12, . . . and second oil feed chambers 13, 13, . . . alternately. The first oil feed chambers 12, 12, . . . are in communication of a right side cylinder chamber $S_R$ of a hydraulic cylinder S to which oil is fed through an oil feed hole formed in the valve body 1. The second oil feed chambers 13, 13, . . . are in communication with a left side cylinder chamber $S_L$ of the hydraulic cylinder S through an oil feed hole formed in the valve body 1. Further, the second oil grooves 5, 5, . . . parallelly arranged in the outer peripheral surface of the valve spool 2 alternately form oil supply chambers 10, 10, . . . which are in communication with discharge side of a hydraulic pump P as an oil pressure source through an oil introducing hole formed in the valve body 1 and oil discharge chambers 11, 11, . . . which are in communication with an oil tank T to receive the oil through an oil discharge hole formed in the valve spool 2.

In an example shown in FIG. 2, second oil grooves 5, 5, . . . parallelly arranged in an outer peripheral surface of a valve spool 2 alternately form first oil feed chambers 12, 12, . . . and second oil feed chambers 13, 13, . . . . The first oil feed chambers 12, 12, . . . are in communication a right side cylinder chamber $S_R$ of a hydraulic cylinder S to which oil is fed through an oil feed hole formed in the valve body 1. The second oil feed chambers 13, 13, . . . are in communication with a left side cylinder chamber $S_L$ of the hydraulic cylinder S through an oil feed hole formed in the valve body 1. First oil grooves 4, 4, . . . parallelly arranged in an inner peripheral surface of the valve body 1 alternately form oil supply chambers 10, 10, . . . which are in communication with discharge side of a hydraulic pump P through an oil introducing hole formed in the valve body 1 and oil discharge chambers 11, 11, . . . which are in communication with an oil tank T through an oil discharge hole formed in the valve spool 2.

In any of these examples, the first oil grooves 4, 4, . . . and the second oil grooves 5, 5, . . . are in communication to each other while having equal sectional areas in the circumferential direction at both sides in widthwise direction, in a neutral state in which the above-described relative angular displacement is not generated, and the communicating portions act as throttle portions 6a, 6b whose throttle areas are changed in accordance with the relative angular displacement. Therefore, oil pressure to be supplied to the cylinder chambers $S_R$, $S_L$ through the first and second oil feed chambers 12, 13 are controlled by the change in throttle areas of these throttle portions 6a, 6b.

Next, the operation of the hydraulic control valve associated with the relative angular displacement.

FIGS. 3A and 3B are explanatory views of operation of an oil feed chamber, an oil supply chamber, and an oil discharge chamber shown in straightly developed manner, which are arranged along a fitted peripheral surfaces of a valve body and a valve spool in the conventional hydraulic control valve.

FIG. 3A shows a state in which the relative angular displacement is not generated between the valve body 1 and the valve spool 2. In this state, the pressurized oil supplied from the hydraulic pump P to the oil supply chambers 10 flows such that the oil is equally divided into the first and second oil feed chamber 12, 13 which are adjacent to each other through the throttle portions 6a, 6a having the equal sectional areas in the circumferential direction on the both sides of the oil supply chambers 10 and are introduced into the oil discharge chambers 11, 11 through the throttle portions 6b, 6b having the equal sectional areas in the circumferential direction on the both sides of the first and second oil feed chamber 12, 13, and flows into the oil tank T which is in communication with these oil discharge chambers 11, 11. Therefore, the oil pressure supplied to the oil supply chambers 10 is not fed to any of the cylinder chambers $S_R$, $S_L$, and no force is generated in the hydraulic cylinder S.

FIG. 3B shows a state in which the steering torque is applied to the steering wheel, and the relative angular displacement is generated between the valve body 1 and the valve spool 2. In this state, the throttle area of one of the throttle portions 6a, 6a on the both sides of the oil supply chamber 10 (the first oil feed chamber 12 side) is increased, and the throttle area of the other throttle portion 6a (the second oil feed chamber 13 side) is reduced. As a result, the pressurized oil supplied to the oil supply chamber 10 is introduced mainly to the first oil feed chamber 12 through the throttle portion 6a whose throttle area is increased. That is, a pressure difference is generated between the first oil feed chamber 12 and the second oil feed chamber 13, i.e., between the cylinder chambers $S_R$, $S_L$ which are in communication with the first oil feed chamber 12 and the second oil feed chamber 13, and the hydraulic cylinder S generates hydraulic force (steering assist force) corresponding to this pressure difference.

The pressure difference generated at that time depends on a degree of reduction in the throttle area of the other throttle portion 6a (the second oil feed chamber 13 side), and the degree of the reduction corresponds to magnitude of the relative angular displacement, i.e., the magnitude of the steering torque applied to the steering wheel. Therefore, the force generated by the hydraulic cylinder S has a direction and magnitude corresponding to the steering torque, and can assist the steering operation. At that time, oil in the left cylinder chamber $S_L$ pushed out by the operation of the hydraulic cylinder S is circulated into the second oil feed chamber 13, and is introduced into the oil discharge chamber 11 through the throttle portion 6b whose throttle area is increased on the one side of the second oil feed chamber 13, and is discharged into the oil tank T which is in communication with the oil discharge chamber 11.

Meanwhile, preferable increasing characteristics of the steering assist force in the power steering apparatus are not characteristics to increase in proportion to the steering torque, but are characteristics in which the steering assist force is gradually increased in a range having small steering torque but the force is rapidly increased when the steering torque exceeds a predetermined limit. To obtain such characteristics, chamfer portions 7, 7, . . . each having a predetermined inclination angle with respect to a peripheral surface of the valve spool 2 and having a predetermined width in the circumferential direction are formed on corner portions of the first oil grooves 4, 4, . . . side of all of the second oil grooves 5, 5, . . . of the valve spool 2. With these chamfer portions, the throttle areas of the throttle portions 6a, 6b are slowly changed with respect to the relative angular displacement between the valve body 1 and the valve spool 2.

In the hydraulic control valve operating as described above, four, six, eight or more first and second oil grooves 4, 5 are equally disposed, half of one of the first and second oil grooves 4 and 5 are formed as the oil supply chambers 10, and the remaining half are formed as the oil discharge chambers 11.

In a hydraulic control valve in which four oil grooves are disposed at equal distances from one another, since the oil supply chambers 10 and oil discharge chambers 11 are provided two each, the flow rate of the pressurized oil introduced into one oil supply chamber 10 can be relatively large. On the other hand, since the two oil supply chambers 10 whose oil pressure become high because they control the hydraulic cylinder S are disposed with phase difference of 180 degrees, balance of pressure distribution applied to the valve body 1 is inferior, and the valve body 1 is deformed into elliptic shape. At that time, a fitting gap of about 10 μm between the valve body 1 and the valve spool 2 is changed, and there is an adverse possibility that biting phenomenon is generated between the valve body 1 and the valve spool 2.

In a hydraulic control valve in which six oil grooves are disposed at equal distances from one another, the oil supply chamber 10 and oil discharge chamber 11 are provided three each, and in a hydraulic control valve in which eight oil grooves are disposed at equal distances from one another, the oil supply chamber 10 and oil discharge chamber 11 are provided four each. Therefore, the flow rate of the pressurized oil distributed to one oil supply chamber 10 is smaller than that of the hydraulic control valve in which four oil grooves are disposed at equal distances. However, in the hydraulic control valve in which six oil grooves are disposed at equal distances, the oil supply chambers 10 whose oil pressure become high are disposed at three locations with phase difference of 120 degrees, and in the hydraulic control valve in which eight oil grooves are disposed at equal distances, the oil supply chambers 10 whose oil pressure become high are disposed at four locations with phase difference of 90 degrees. Therefore, the balance of the pressure distribution applied to the valve body 1 is excellent, the deformation of the valve body 1 is restrained, and the fitting gap between the valve body 1 and the valve spool 2 is excellently held. That is, it is preferable to dispose at least six oil grooves in the hydraulic control valve.

The present applicant is developing a power steering apparatus in which the conventional hydraulic control valve of the above-described structure is used, a hydraulic pump is standby controlled (low-speed rotation or zero-speed rotation), and when a steering torque is not applied to a steering wheel at the time of idling or the like, the small or zero flow rate of pressurized oil about 1 to 2 liter/min is introduced into the oil supply chamber of the hydraulic control valve, the steering angle of the steering wheel is detected, and the flow rate of oil of the hydraulic pump can be increased in accordance with the steering angular velocity based on the detected steering angle. According to such a power steering apparatus, it is possible to abruptly change the flow rate to be controlled of the hydraulic control valve from the small flow rate as small as possible or zero flow rate to high flow rate as compared with the conventional small flow rate.

FIG. 4 is a view showing the flow rate characteristics of the conventional hydraulic control valve showing a relation between steering angular velocity and the flow rate of a pump, and FIG. 5 is a view showing hydraulic characteristics of the conventional hydraulic control valve showing a relation between steering torque applied to the steering wheel and hydraulic force controlled by the hydraulic control valve.

In FIG. 4, the number of revolution of an electric motor for the hydraulic pump is increased as the steering angular velocity is increased, and the flow rate of the hydraulic pump is straightly increased. In FIG. 5, the increase in the steering torque is reduced as the hydraulic force controlled by the hydraulic control valve is increased.

However, the conventional hydraulic control valve is designed or produced such that the flow rate (minimum flow rate to be controlled) at the time of standby control becomes the small flow rate of about 1 to 2 liter/min or zero flow rate as described above. Therefore, when the conventional hydraulic control valve is applied to the hydraulic control valve under development, the oil pressure characteristics in a region where the flow rate to be controlled is minimum which is smaller than the conventional small flow rate become unstable. That is, when the oil pressure rises at the beginning of steering operation, there are problems that the hydraulic characteristics becomes abruptly discontinuous, and the steering torque becomes discontinuous.

FIG. 6 is a view for explaining a state where the hydraulic characteristics of the conventional hydraulic control valve become discontinuous.

Here, it is supposed that the conventional hydraulic control valve whose hydraulic characteristics in the small flow rate region is varied largely and which has six or eight oil grooves disposed at equal distances from one another is applied to the hydraulic control valve under development as it is. That is, in the case of the hydraulic control valve having eight oil grooves disposed at equal distances from one another, the flow rate to be distributed to each of the throttle portions is reduced as small as 0.125 liter/min (1 liter/min is equally divided into eight) or less, and this small flow rate causes large variation in the hydraulic characteristics, and this is controlled by the chamfer portion and therefore, the rise of the oil pressure characteristics at the beginning of the steering operation becomes unstable. Therefore, when the steering operation is started, "jump" is generated in the oil pressure characteristics as shown in FIG. 6, the hydraulic characteristics become discontinuous, and the steering torque becomes discontinuous.

On the other hand, in the case of the hydraulic control valve having four oil grooves disposed at equal distances from one another, the flow rate to be distributed to each of the throttle portions is increased as compared to a case in which a hydraulic control valve having six or more oil grooves disposed at equal distances from one another, but the balance of pressure distribution applied to the valve body is inferior, the biting phenomenon is generated between the valve body and the valve spool and thus, it is not preferable to apply the hydraulic control valve having the four oil grooves disposed at equal distances from one another as already described above.

The present invention has been accomplished to solve the above-described problems, and it is one object of the invention to provide a hydraulic control valve in which only ones of the first and the second oil grooves facing the throttle portions between the oil supply chambers and the oil feed chambers or facing the throttle portions between the oil discharge chamber and the oil feed chambers are provided with the chamfer portions formed on those corner portions of the ones of the first and the second oil grooves which are closer to the other ones. Therefore, even if six or more oil grooves are disposed at equal distances from one another, it is possible to stabilize the hydraulic characteristics when the minimum flow rate to be controlled is reduced as small as possible, and to eliminate the discontinuity of the hydraulic characteristics in a region where the flow rate to be controlled is minimum.

It is another object of the present invention to provide a power steering apparatus which includes a hydraulic control valve having stable hydraulic characteristics in a region where the flow rate to be controlled is minimum, and the hydraulic pump is driven such that a flow rate becomes low or zero flow rate during the standby control when steering operation is not carried out, and such that the flow rate becomes high flow rate in accordance with steering angular velocity when steering operation is carried out. With this design, it is possible to reduce the energy consumption while the steering wheel is not operated at the time of idling for example without the discontinuity of the hydraulic characteristics.

DISCLOSURE OF THE INVENTION

In a hydraulic control valve of the present invention, a valve spool is fitted into a cylindrical valve body such that they can be displaced relatively angularly, a plurality of first oil grooves provided on a fitted peripheral surface of the valve body and a plurality of second oil grooves provided on a fitted peripheral surface of the valve spool are disposed alternatively, gaps between the first and second oil grooves which are adjacent in a peripheral direction act as throttle portions which change throttle areas in accordance with the relative angular displacement between the valve body and the valve spool, ones of the first and second oil grooves alternately form oil supply chambers and oil discharge chambers, and the other ones form oil feed chambers interposed between the oil supply chambers and the oil discharge chambers, wherein ones of the first and the second oil grooves facing the throttle portions between the oil supply chambers and the oil feed chambers or facing the throttle portions between the oil discharge chamber and the oil feed chambers are provided with chamfer portions for adjusting the throttle areas formed on those corner portions of the ones of the first and the second oil grooves which are closer to the other ones.

With this structure, chamfer portions are provided only on throttle portions between an oil supply chamber and oil feed chambers, or only throttle portions between an oil discharge chamber and oil feed chambers, and the number of portions where the flow rate is controlled by the chamfer portions is reduced to half as compared with the conventional structure. As a result, even if six or more oil grooves of each of a valve body and a valve spool are disposed at equal distances from one another, when the minimum flow rate to be controlled is reduced as small as possible, a distribution amount for one portion where the flow rate is controlled can be doubled as compared with a conventional structure, it is possible to stabilize the hydraulic characteristics in a region where the flow rate to be controlled is minimum, and to eliminate the discontinuity of the hydraulic characteristics.

For the above-described hydraulic control valve, the following structures can be employed simultaneously or independently.

That is, in a hydraulic control valve of the present invention, a valve spool is fitted into a cylindrical valve body such that they can be displaced relatively angularly, a plurality of first oil grooves provided on a fitted peripheral surface of the valve body and a plurality of second oil grooves provided on a fitted peripheral surface of the valve spool are disposed alternatively, gaps between the first and second oil grooves which are adjacent in a peripheral direction act as throttle portions which change throttle areas in accordance with the relative angular displacement between the valve body and the valve spool, ones of the first and second oil grooves alternately form oil supply chambers and oil discharge chambers, and the other ones form oil feed chambers interposed between the oil supply chambers and the oil discharge chambers, wherein ones of the first and the second oil grooves facing the throttle portions where a flow is generated from the second oil groove toward the first oil groove are provided with chamfer portions for adjusting the throttle areas formed on those corner portions of the ones of the first and the second oil grooves which are closer to the other ones.

For example, as shown in FIGS. 1, 3A, and 3B, when the first oil grooves of the valve body are formed as the oil feed chambers, and the second oil grooves are formed as the oil supply chambers and oil discharge chambers alternately to form the hydraulic control valve (inventions corresponding to this are shown in FIGS. 7, 8A, 8B, 11A, and 11B), flows from the second oil groove toward the first oil groove are generated in the throttle portions on the both sides of the oil supply chamber, and flows from the first oil groove toward the second oil groove are generated in the throttle portions on the both sides of the oil discharge chamber. At that time, when high pressure oil flows from the second oil groove toward the first oil groove, the pressure is abruptly reduced as the oil flows through the chamfer. Therefore, especially when the relative angular displacement between the valve body and the valve spool is great, cavitation which causes flowing noise is generated.

Thereupon, in the present invention, the chamfer is provided on the corner of one of the first and second oil grooves facing the throttle portion where a flow is generated from the second oil groove toward the first oil groove. Therefore, it is possible to flow the operating oil introduced in the oil supply chamber while gradually and straightly reducing the pressure from the second oil groove toward the first oil groove along the chamfer, and it is possible to reduce the cavitation which causes flowing noise and which is generated when the relative angular displacement between the valve body and the valve spool is great.

The same is true when the second oil grooves of the valve spool are formed as oil feed chambers, and the first oil grooves of the valve body are formed as the oil supply chambers and oil discharge chambers to form the hydraulic control valve (see FIGS. 9, 10A, 10B, 12A, and 12B) as shown in FIG. 2, flows from the first oil groove toward the second oil groove are generated in throttle portions on the both sides of the oil supply chamber, and flows from the second oil groove toward the first oil groove are generated in the throttle portion on the opposite sides of the oil discharge chamber. At that time, when high pressure oil flows from the second oil groove toward the first oil groove, the pressure is gradually and straightly reduced from the second oil groove toward the first oil groove. Therefore, especially when the high pressure oil flow from the second oil groove toward the first oil groove, it is reduced the pressure gradually and straightly along the chamfer and therefore, it is possible reduce the cavitation which causes flowing noise.

Further, a power steering apparatus of the present invention comprises a hydraulic pump driven by an electric motor to supply oil pressure to a hydraulic cylinder for assisting steering operation, and a hydraulic control valve interposed on an oil pressure path between the hydraulic pump and the hydraulic cylinder to control oil pressure from the hydraulic pump to two cylinder chambers included in the hydraulic cylinder, characterized in that the hydraulic control valve is one of the above-described the hydraulic control valves.

With this structure, the hydraulic characteristics in a region where the flow rate to be controlled is minimum is stable, and there is no discontinuity of the hydraulic characteristics. That is, even if a hydraulic control valve having six or more oil grooves disposed at equal distances from one another is used, the discontinuity is not generated in the steering torque, and it is possible to stop the operation of the electric motor or to drive the motor at extremely low speed. Therefore, it is possible to inexpensively produce a power steering apparatus having a hydraulic control valve capable of reducing the energy consumption while the steering operation is not conducted, e.g., at the time of idling. Further, it is possible to reduce the cavitation which causes flowing noise and which is caused when the relative angular displacement between the valve body and the valve spool is great.

Another power steering apparatus of the present invention comprises a hydraulic pump driven by an electric motor to supply oil pressure to a hydraulic cylinder for assisting steering operation, and a hydraulic control valve interposed on an oil pressure path between the hydraulic pump and the hydraulic cylinder to control oil pressure from the hydraulic pump to two cylinder chambers included in the hydraulic cylinder, in the hydraulic control valve, a valve spool is fitted into a cylindrical valve body such that they can be displaced relatively angularly, a plurality of first oil grooves provided on a fitted peripheral surface of the valve body and a plurality of second oil grooves provided on a fitted peripheral surface of the valve spool are disposed alternatively, gaps between the first and second oil grooves which are adjacent in a peripheral direction act as throttle portions which change throttle areas in accordance with the relative angular displacement between the valve body and the valve spool, ones of the first and second oil grooves alternately form oil supply chambers and oil discharge chambers, and the other ones form oil feed chambers interposed between the oil supply chambers and the oil discharge chambers, wherein in the hydraulic control valve, ones of the first and the second oil grooves facing the throttle portions between the oil supply chambers and the oil feed chambers or facing the throttle portions between the oil discharge chamber and the oil feed chambers are provided with chamfer portions for adjusting the throttle areas formed on those corner portions of the ones of the first and the second oil grooves which are closer to the other ones.

With this structure, the hydraulic characteristics in a region where the flow rate to be controlled is minimum is stable, and there is no discontinuity of the hydraulic characteristics. That is, even if a hydraulic control valve having six or more oil grooves disposed at equal distances from one another is used, the discontinuity is not generated in the steering torque, and it is possible to stop the operation of the electric motor or to drive the motor at extremely low speed. Therefore, it is possible to inexpensively produce a power steering apparatus having a hydraulic control valve capable of reducing the energy consumption while the steering operation is not conducted, e.g., at the time of idling. Further, it is possible to reduce the cavitation which causes flowing noise and which is caused when the relative angular displacement between the valve body and the valve spool is great.

Further, a power steering apparatus of the present invention comprises a hydraulic pump driven by an electric motor to supply oil pressure to a hydraulic cylinder for assisting steering operation, and a hydraulic control valve interposed on an oil pressure path between the hydraulic pump and the hydraulic cylinder to control oil pressure from the hydraulic pump to two cylinder chambers included in the hydraulic cylinder, in the hydraulic control valve, a valve spool is fitted into a cylindrical valve body such that they can be displaced relatively angularly, a plurality of first oil grooves provided on a fitted peripheral surface of the valve body and a plurality of second oil grooves provided on a fitted peripheral surface of the valve spool are disposed in alternatively, gaps between the first and second oil grooves which are adjacent in a peripheral direction act as throttle portions which change throttle areas in accordance with the relative angular displacement between the valve body and the valve spool, ones of the first and second oil grooves alternately form oil supply chambers and oil discharge chambers, and the other ones form oil feed chambers interposed between the oil supply chambers and the oil discharge chambers, wherein in the hydraulic control valve, each of the chamfer portions for adjusting the throttle area is provided on the corner facing the throttle portion where a flow is generated from the second oil groove toward the first oil groove.

With this structure, the hydraulic characteristics in a region where the flow rate to be controlled is minimum is stable, and there is no discontinuity of the hydraulic characteristics. That is, even if a hydraulic control valve having six or more oil grooves disposed at equal distances from one another is used, the discontinuity is not generated in the steering torque, and it is possible to stop the operation of the electric motor or to drive the motor at extremely low speed. Therefore, it is possible to inexpensively produce a power steering apparatus having a hydraulic control valve capable of reducing the energy consumption while the steering operation is not conducted, e.g., at the time of idling. Further, it is possible to reduce the cavitation which causes flowing noise and which is caused when the relative angular displacement between the valve body and the valve spool is great.

Further, according to another aspect of the present invention, in any one of the above-described power steering apparatus, the hydraulic pump is driven such that a flow rate becomes low or zero when steering operation is not carried out, and such that the flow rate becomes high in accordance with steering angular velocity when steering operation is carried out.

Alternatively, according to another aspect of the present invention, in any one of the above-described power steering apparatus, the electric motor drives the hydraulic pump such that oil pressure is supplied at zero flow rate or predetermined small flow rate as small as possible when steering operation is not carried out, and as the steering operation is carried out, the oil pressure is supplied at high flow rate abruptly in accordance with the steering angular velocity.

Therefore, it is possible to realize a power steering apparatus in which the flow rate of the hydraulic pump is increased based on the steering angular velocity, and even when the above-mentioned flow rate to be controlled of the hydraulic control valve is abruptly changed to high flow rate from low flow rate or zero flow rate which is lower than the conventional minimum flow rate to be controlled, the hydraulic characteristics in a region where the flow rate to be controlled is minimum is stable, and there is no discontinuity of the hydraulic characteristics.

BRIEF DESCRIPTION OF THE DRAWINGS

FIGS. 3A and 3B are explanatory views of operation of an oil feed chamber, an oil supply chamber, and an oil discharge chamber shown in straightly developed manner, which are arranged along a fitted peripheral surfaces of a valve body and a valve spool in the conventional hydraulic control valve;

FIGS. 8A and 8B are explanatory views of operation of an oil feed chamber, an oil supply chamber, and an oil discharge chamber shown in straightly developed manner, which are arranged along a fitted peripheral surfaces of a valve body and a valve spool in the hydraulic control valve of the present invention;

FIGS. 10A and 10B are explanatory views of operation of an oil feed chamber, an oil supply chamber, and an oil discharge chamber shown in straightly developed manner, which are arranged along a fitted peripheral surfaces of a valve body and a valve spool of the second embodiment in the hydraulic control valve of the present invention;

BEST MODE FOR CARRYING OUT OF THE INVENTION

The present invention will be explained below in detail based on the drawings showing embodiments of the invention.

FIRST EMBODIMENT

Figure 7:
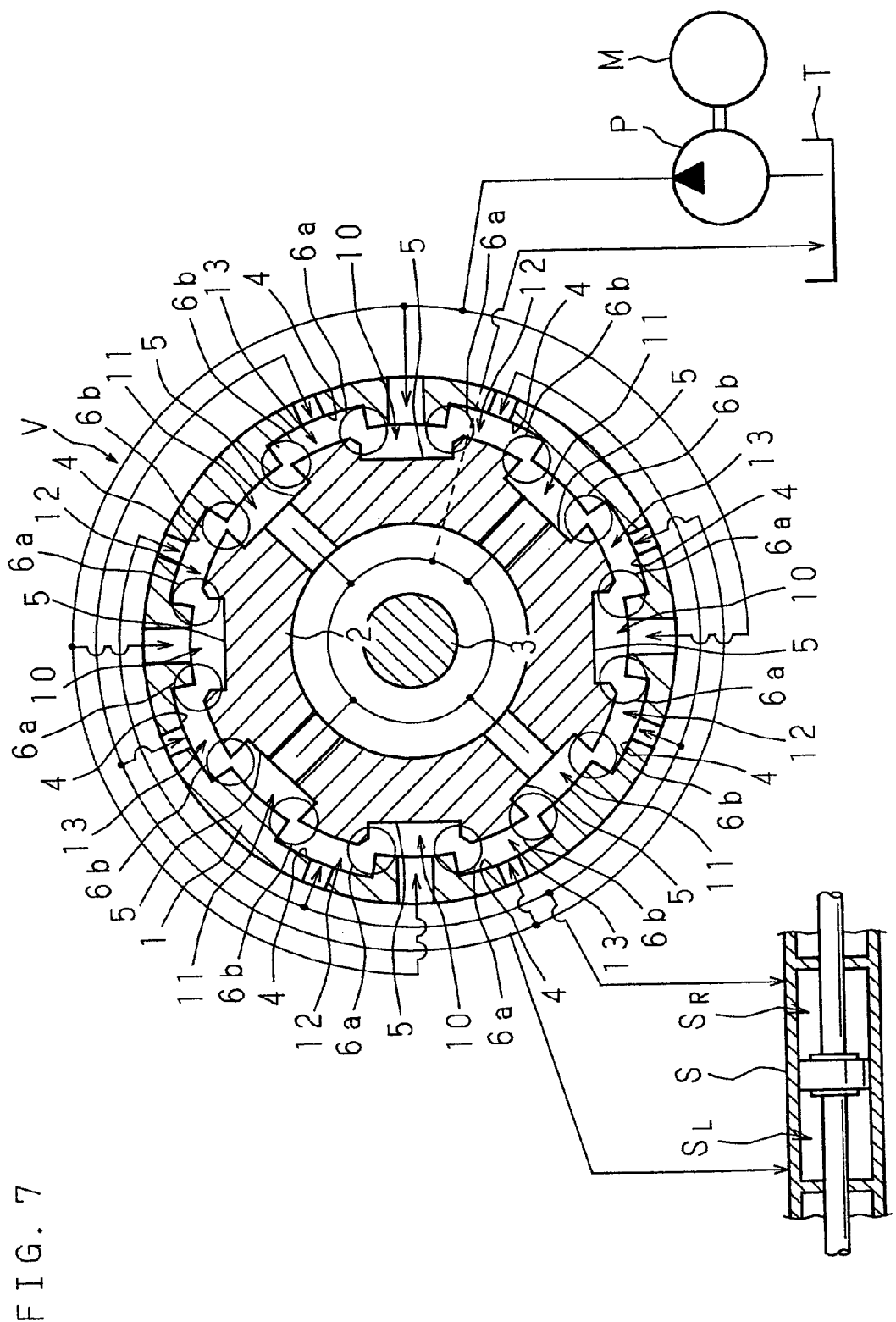
FIG. 7 is a schematic transverse sectional view showing a first embodiment of a hydraulic control valve according to the present invention, together with a hydraulic circuit of a power steering apparatus.

FIG. 7 is a schematic transverse sectional view showing a first embodiment of a hydraulic control valve according to the present invention, together with a hydraulic circuit of a power steering apparatus.

Figure 1:
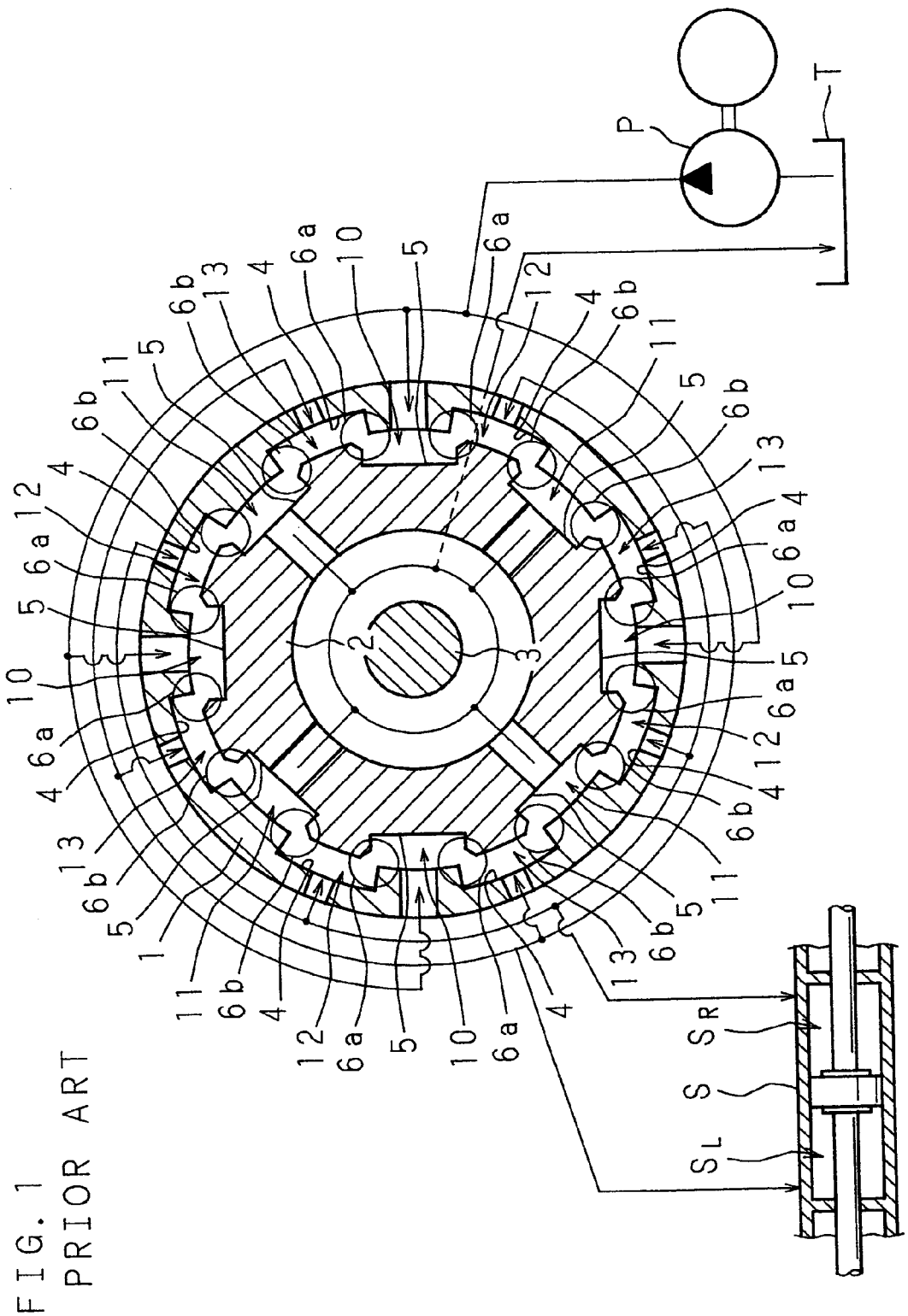
FIG. 1 is a schematic transverse sectional view showing one example of a structure of a conventional hydraulic control valve described in Japanese Patent Application Laid-open No. H9-39814 (1997)

In FIG. 7, a numeral 1 represents a valve body, and a numeral 2 represents a valve spool. Basic structures of these valve body 1 and valve spool 2 are the same as the conventional ones shown in FIG. 1. Eight first oil grooves 4, 4, . . . having equal widths are parallelly disposed in an inner peripheral surface of the cylindrical valve body 1 at equal distances from one another in the circumferential direction. Eight second oil grooves 5, 5, . . . are parallelly disposed in an outer peripheral surface of the thick and cylindrical valve spool 2 having the outer diameter which is substantially equal to the inner diameter of the valve body 1 at equal distances in the circumferential direction.

The valve spool 2 is relatively rotatably fitted into the valve body 1 coaxially, and the valve spool 2 and the valve body 1 are connected to each other by a torsion bar 3 which is inserted into the valve spool 2. The first oil grooves 4, 4, . . . and the second oil grooves 5, 5, . . . are placed alternatively in the circumferential direction as shown in the drawing in a neutral state in which the torsion bar 3 is not twisted, and the first oil grooves 4, 4, . . . and the second oil grooves 5, 5, . . . are positioned such that each groove is in communication with adjacent grooves at both sides.

Each of the first oil grooves 4, 4, . . . of the valve body 1 is opposed to a land between the second oil grooves 5, 5, . . . of the valve spool 2, and each of the second oil grooves 5, 5, . . . of the valve spool 2 is opposed to a land between the first oil grooves 4, 4, . . . of the valve body 1. With such a structure, eight oil chambers inside of the first oil grooves 4, 4, . . . and eight oil chambers outside of the second oil grooves 5, 5, . . . are alternately arranged while having communication portions therebetween along the fitting peripheral surfaces between the valve body 1 and the valve spool 2.

The relative angle between the valve body 1 and the valve spool 2 can be displaced within a range of twist of the torsion bar 3 which connects the valve body 1 and the valve spool 2 to each other, and the communication portion between each of the oil chambers, i.e., a portion between corner portions of both side first and second oil grooves 4 and 5 opposed to each other in the widthwise direction act as throttle portions 6a and 6b which increase or reduce a sectional area (throttle area) in the circumferential direction of each of the communication portion in accordance with the relative angle displacement.

Among the eight oil chambers formed by the second oil grooves 5, 5, . . . of the valve spool 2, alternate four of them pass through a peripheral wall of the valve body 1, and are brought into communication with a discharge side of a hydraulic pump P which is an oil pressure source through independent oil introducing holes having openings in outer sides of the second oil grooves 5, 5, . . . , and form oil supply chambers 10, 10 . . . to which pressurized oil is supplied from the hydraulic pump P. On the other hand, the remaining four oil chambers pass through the valve spool 2 in the radial direction, and are brought into communication with an oil tank T to which the oil is discharged through independent oil discharge holes having openings in bottoms of the second oil grooves 5, 5, . . . and through a hollow portion in the valve spool 2, and form oil discharge chambers 11, 11, . . . which act as passages for discharging oil into the oil tank T.

On the other hand, among the eight oil chambers formed inside the first oil grooves 4, 4, . . . , four of them which are adjacent to the same side as the oil supply chambers 10, 10 . . . in the circumferential direction pass through a peripheral wall of the valve body 1, are brought into communication with a right side cylinder chamber $S_R$ of a hydraulic cylinder S to which the oil is fed through independent oil introducing holes having openings in bottoms of the first oil grooves 4, 4, . . . , and form first oil feed chambers 12, 12, . . . leading to the cylinder chamber $S_R$. The remaining four oil chambers are brought into communication with a left side cylinder chamber $S_L$ through oil introducing holes, and form second oil feed chambers 13, 13, . . . leading to the cylinder chamber $S_L$. Therefore, oil paths leading to the oil discharge chamber 11 through the first oil feed chamber 12 or second oil feed chamber 13 are formed on both sides of the oil supply chamber 10. Further, the oil supply chamber 10 is in communication with the first oil feed chamber 12 and the second oil feed chamber 13 through the throttle portion 6a, and the oil discharge chamber 11 is in communication with the first oil feed chamber 12 and the second oil feed chamber 13 through the throttle portion 6b.

A hydraulic control valve V having the above-explained structure is basically the same as the conventional hydraulic control valve. However, in the present invention, corner portions of the second oil grooves 5 forming the throttle portions 6a, 6a between the oil supply chamber 10 and the first and second oil feed chambers 12, 13 are respectively provided with chamfer portions (chamfer) portions 7, 7 for adjusting the throttle areas, and corner portions of the second oil grooves 5 forming the throttle portions 6b, 6b between the oil discharge chamber 11 and the first and second oil feed chambers 12, 13 are not provided with chamfer portions for adjusting the throttle areas. Therefore, the flow rate is controlled by the four throttle portions 6a, 6a, . . . provided with the chamfer portions 7.

Each of the chamfer portions 7 is formed such that it has a predetermined inclined angle with respect to the peripheral surface of the valve spool 2 and with this design, the chamfer portion 7 has a predetermined width in the circumferential direction.

The hydraulic control valve V of the present invention is suitably used in a power steering apparatus in which the number of revolution of an electric motor for driving the hydraulic pump P and the flow rate of the hydraulic pump P based on the steering angular velocity are increased or reduced, the flow rate to be controlled of the hydraulic control valve V can be abruptly changed from the low or zero flow rate which is smaller than the conventional minimum flow rate to be controlled to the high flow rate.

FIGS. 8A and 8B are explanatory views of operation of the oil feed chamber, the oil supply chamber, and the oil discharge chamber shown in straightly developed manner, which are arranged along a fitted peripheral surfaces of the valve body and the valve spool in the hydraulic control valve of the present invention.

FIG. 8A shows a state (neutral state) in which the relative angular displacement is not generated between the valve body 1 and the valve spool 2. In this state such as a state at the time of standby control in which the steering wheel is not operated such as idling state, an electric motor M is stopped, or driven at extremely low speed. Therefore, the flow rate of oil introduced from the hydraulic pump P to the oil supply chamber 10 becomes small less than 1 liter/min, and this 1 liter/min is equally divided into four, and the flow rate of about 0.25 liter/min is distributed to one oil supply chamber 10. The pressurized oil distributed to the four oil supply chambers 10 is equally divided into both side oil paths of the four oil supply chambers 10, and reaches the oil discharge chambers 11, 11 through the first oil feed chamber 12 or the second oil feed chamber 13, and flows into the hollow portion inside of the valve spool 2 through the oil discharge holes which are opened at the oil discharge chambers 11, 11, and merge in the hollow portion and circulates into the oil tank T. That is, pressure difference is not generated between the first oil feed chamber 12 and the second oil feed chamber 13 and between the cylinders $S_R$ and $S_L$ of the hydraulic cylinder S which is in communication with the first oil feed chamber 12 and the second oil feed chamber 13 respectively, and the hydraulic cylinder S does not generate any force.

FIG. 8B shows a state in which the steering wheel is operated and the relative angular displacement is generated between the valve body 1 and the valve spool 2. On the other hand, when the relative angular displacement is generated between the valve body 1 and the valve spool 2 as the steering wheel (not shown) is operated, throttle areas of the throttle portions 6a, 6a, . . . between the oil supply chamber 10 and the first and second oil chambers 12, 13, and throttle areas of the throttle portions 6b, 6b, . . . between the oil discharge chamber 11 and the first and second oil chambers 12, 13 are changed.

This change is generated in opposite directions from each other at both sides of the first and second oil chambers 12, 13. For example, the relative rotation of the valve spool 2 with respect to the valve body 1 is generated in the clockwise direction in FIG. 7, the valve spool 2 relatively moves in the direction shown with the hollow arrow in FIG. 8B. At that time, in the first oil feed chamber 12, the throttle area of the throttle portion 6a of the oil supply chamber 10 side is increased, and the throttle area of the throttle portion 6b of the oil discharge chamber 11 side is reduced without being controlled by the chamfer portion. On the other hand, in the second oil feed chamber 13, the throttle area of the throttle portion 6a of the oil supply chamber 10 side is controlled and reduced by the chamfer portion 7, and the throttle area of the throttle portion 6b of the oil discharge chamber 11 side is increased.

Therefore, in the beginning of the steering operation, the flow rate of about 0.25 liter/min is controlled by the chamfer portion 7 facing the throttle portions 6a between the oil supply chamber 10 and the second oil feed chamber 13. On the other hand, the flow rate is not controlled in the throttle portion 6b between the oil discharge chamber 11 and the first oil feed chamber 12 like the conventional example. That is, in the structure in which the eight first oil grooves 4 and the second oil grooves 5 are disposed at equal distances from one another, it is possible to reduce the number of portions where the flow rate is controlled can be reduced to half, i.e., four. Therefore, even through the eight oil grooves are disposed, the number of portions where the flow rate of pressurized oil introduced into the oil supply chamber 10 is controlled is four, and pressurized oil is not distributed to the remaining four portions like the conventional example. Therefore, the amount of distribution per one portion where the flow rate is controlled is doubled as compared with the conventional example having eight oil grooves disposed at equal distances from one another.

In the conventional example having eight oil grooves disposed at equal distances from one another, the flow rate in one portion where the flow rate is controlled becomes excessively small, and it is not possible to stabilize the hydraulic characteristics. However, in the present invention, since the flow rate doubled as compared with the conventional example can be controlled in one portion where the flow rate is controlled, it is possible to stabilize the hydraulic characteristics with the small or zero flow rate, and it is possible to eliminate discontinuity of the hydraulic characteristics.

Figure 5:
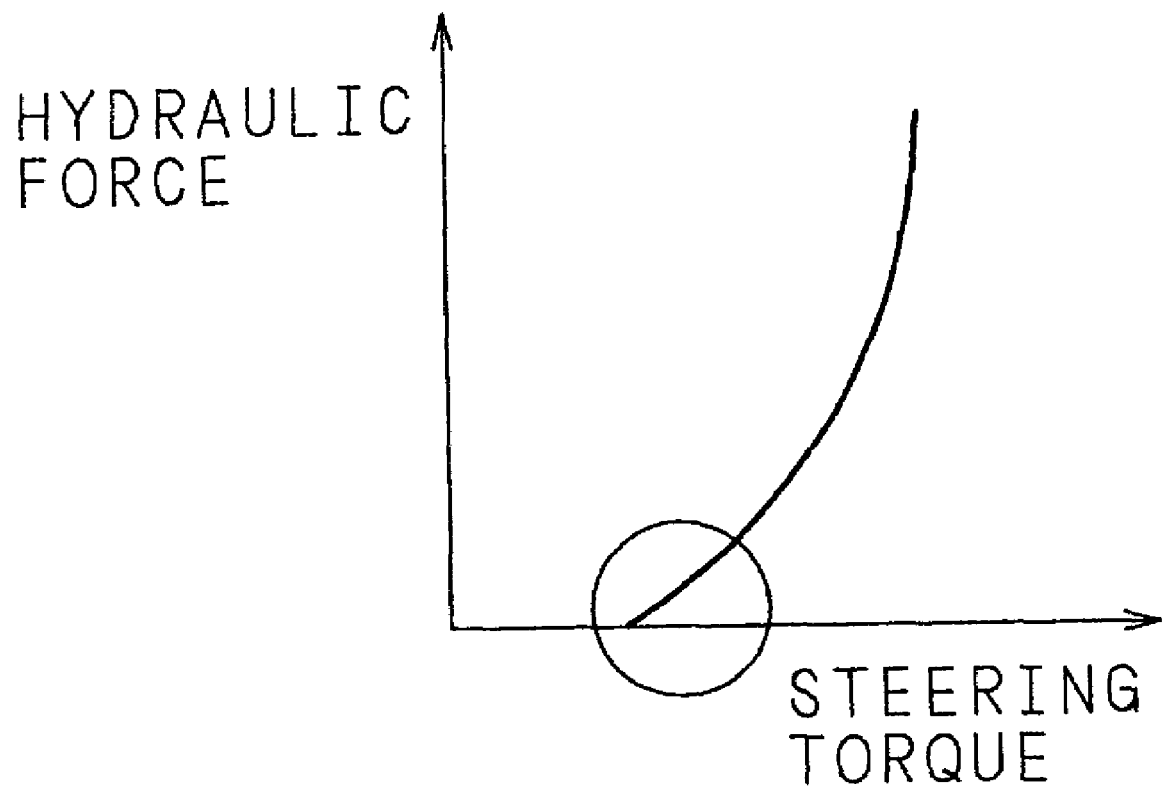
FIG. 5 is a view showing hydraulic characteristics of the conventional hydraulic control valve showing a relation between steering torque applied to a steering wheel and hydraulic force controlled by the hydraulic control valve.
Figure 6:
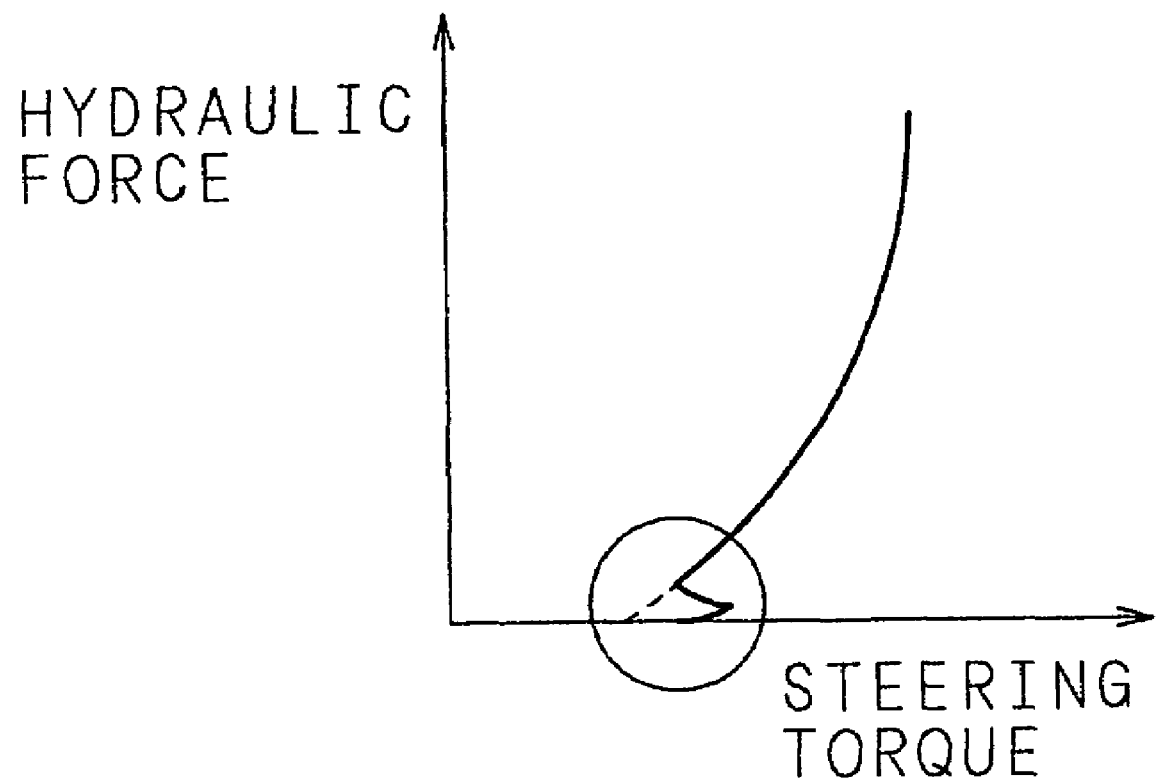
FIG. 6 is a view for explaining a state where the hydraulic characteristics of the conventional hydraulic control valve become discontinuous.

Further, the flow rate is controlled by the chamfer portion 7 facing the throttle portion 6a between the oil supply chamber 10 and the second oil feed chamber 13 as described above, and the flow rate is not controlled by the throttle portion 6b between the oil discharge chamber 11 and the first oil feed chamber 12 like the conventional example. Therefore, almost all the pressurized oil introduced into the oil supply chamber 10 as the steering angular velocity is increased is introduced into the first oil feed chamber 12 through the throttle portion 6a whose throttle area is increased, and the oil is supplied to the right side cylinder chamber $S_R$ which is in communication with the first oil feed chamber 12 and therefore, the oil pressure is abruptly increased as shown in FIG. 5.

As the pressurized oil flows as described above, while the internal pressure of the first oil feed chamber 12 is approximately equivalent to that of the oil supply chamber 10, an internal pressure of the second oil feed chamber 13 is reduced by an amount corresponding to pressure reduction caused by communication (suction) with the throttle portion 6a whose throttle area is reduced between the second oil feed chamber 13 and the oil supply chamber 10, a pressure difference is generated between the first and second oil chambers 12, 13 and between the cylinder chambers $S_R$ and $S_L$ which are in communication with the first and second oil chambers 12, 13, and the hydraulic cylinder S generates the hydraulic force (steering assist force) flowing from the right side cylinder chamber $S_R$ to the left side cylinder chamber $S_L$.

With such an operation of the hydraulic cylinder S, operating oil in the left side cylinder chamber $S_L$ is pushed out from the cylinder chamber $S_L$, and circulated into the second oil feed chamber 13 which is in communication with the cylinder chamber $S_L$, merges with the operating oil from the oil supply chamber 10, and is introduced into the oil discharge chamber 11 through the throttle portion 6b whose throttle area is increased in the other side of the second oil feed chamber 13, and is discharged into the oil tank T through the hollow portion of the valve spool 2.

The steering assist force generated by the hydraulic cylinder S by the above-described operation depends on a degree of reduction in throttle areas of the throttle portion 6a between the oil supply chamber 10 and the second oil feed chamber 13, and the throttle portion 6b between the oil discharge chamber 11 and the first oil feed chamber 12. Here, the degree of reduction in throttle areas of the throttle portions 6a and 6b correspond to the relative angular displacement between the valve body 1 and the valve spool 2, and this relative angular displacement corresponds to magnitude of the steering angle. Therefore, the hydraulic cylinder S generates the steering assist force corresponding to the magnitude of the steering angle.

In the operational state shown in FIG. 8B, pressurized oil flow at high speed through the throttle portion 6a whose throttle area is reduced between the oil supply chamber 10 and the second oil feed chamber 13, by the influence of the pressure difference at opposite sides of the throttle portion 6a. There, the chamfer portions 7, 7 are disposed such as to face the pair of throttle portions 6a, 6a of the four second oil grooves 5 forming the oil supply chamber 10 and with this design, the pressurized oil in the oil supply chamber 10 flows from the second oil groove 5 toward the first oil groove 4 along the chamfer 7. Therefore, it is possible to gradually and straightly reduce the pressure of the operating oil flowing through the throttle portions 6a, 6a along the chamfer portions 7, 7, and to reduce the generation of cavitation.

Further, when the relative rotation of the valve spool 2 with respect to the valve body 1 is generated in the counterclockwise direction in FIG. 7 which is opposite from the above-described case, the throttle area of the throttle portion 6a of the oil supply chamber 10 is increased in the second oil feed chamber 13, and the throttle area of the throttle portion 6b of the oil discharge chamber 11 is reduced without being controlled by the chamfer portion. Whereas, in the first oil feed chamber 12, the throttle area of the throttle portion 6a of the oil supply chamber 10 is controlled and reduced by the chamfer 7, and the throttle area of the throttle portion 6b of the oil discharge chamber 11 is increased.

Therefore, almost all the pressurized oil introduced into the oil supply chamber 10 is introduced mainly to the second oil feed chamber 13 through the throttle portion 6a whose throttle area is increased, and is supplied to the left side cylinder chamber $S_L$ which is in communication with the second oil feed chamber 13, and the hydraulic cylinder S generates the hydraulic force (steering assist force) flowing from the left side cylinder chamber $S_L$ to the right side cylinder chamber $S_R$.

SECOND EMBODIMENT

Figure 9:
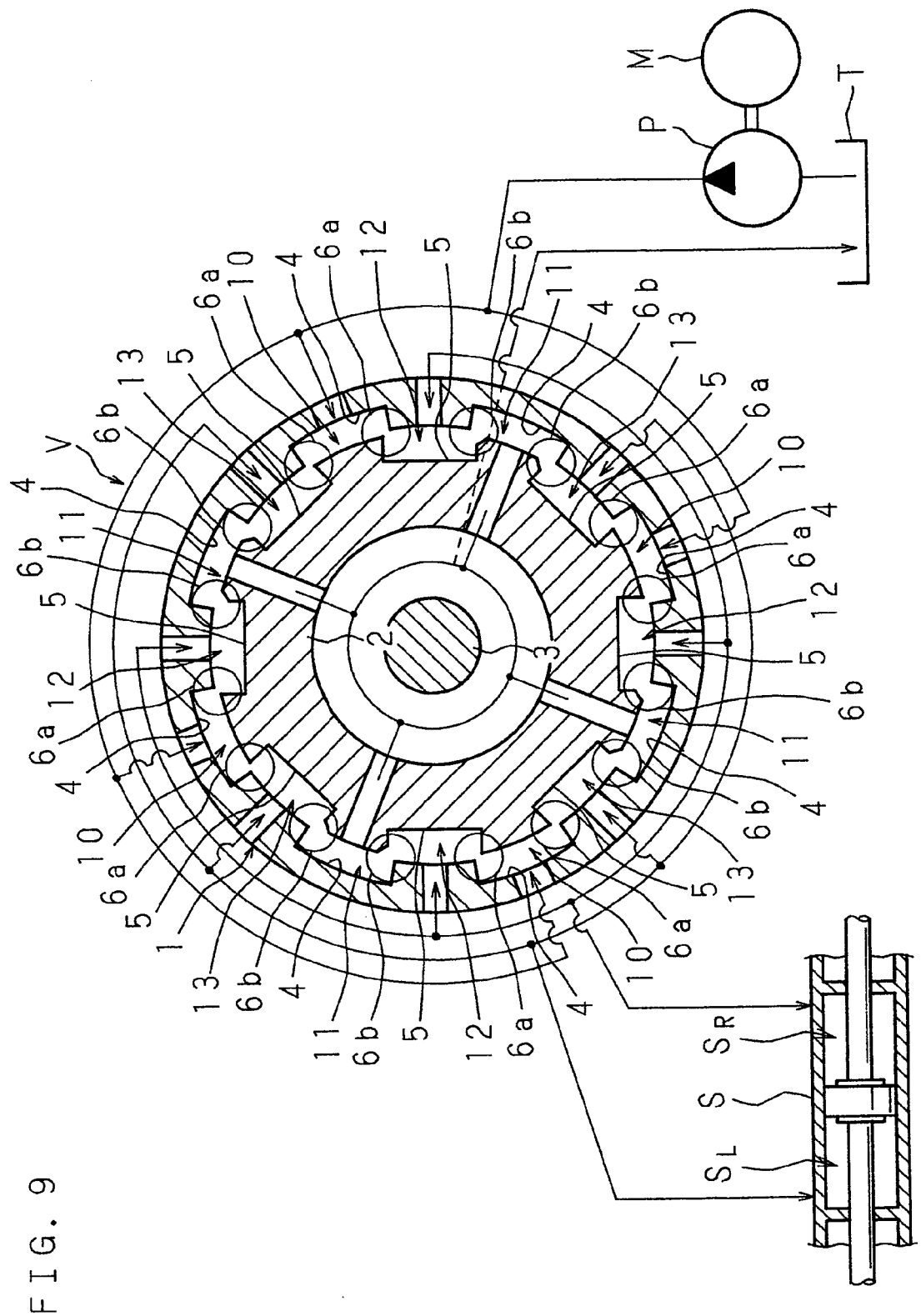
FIG. 9 is a schematic transverse sectional view showing a second embodiment of a hydraulic control valve according to the present invention, together with a hydraulic circuit of a power steering apparatus.

FIG. 9 is a schematic transverse sectional view showing a second embodiment of a hydraulic control valve according to the present invention, together with a hydraulic circuit of a power steering apparatus.

Figure 2:
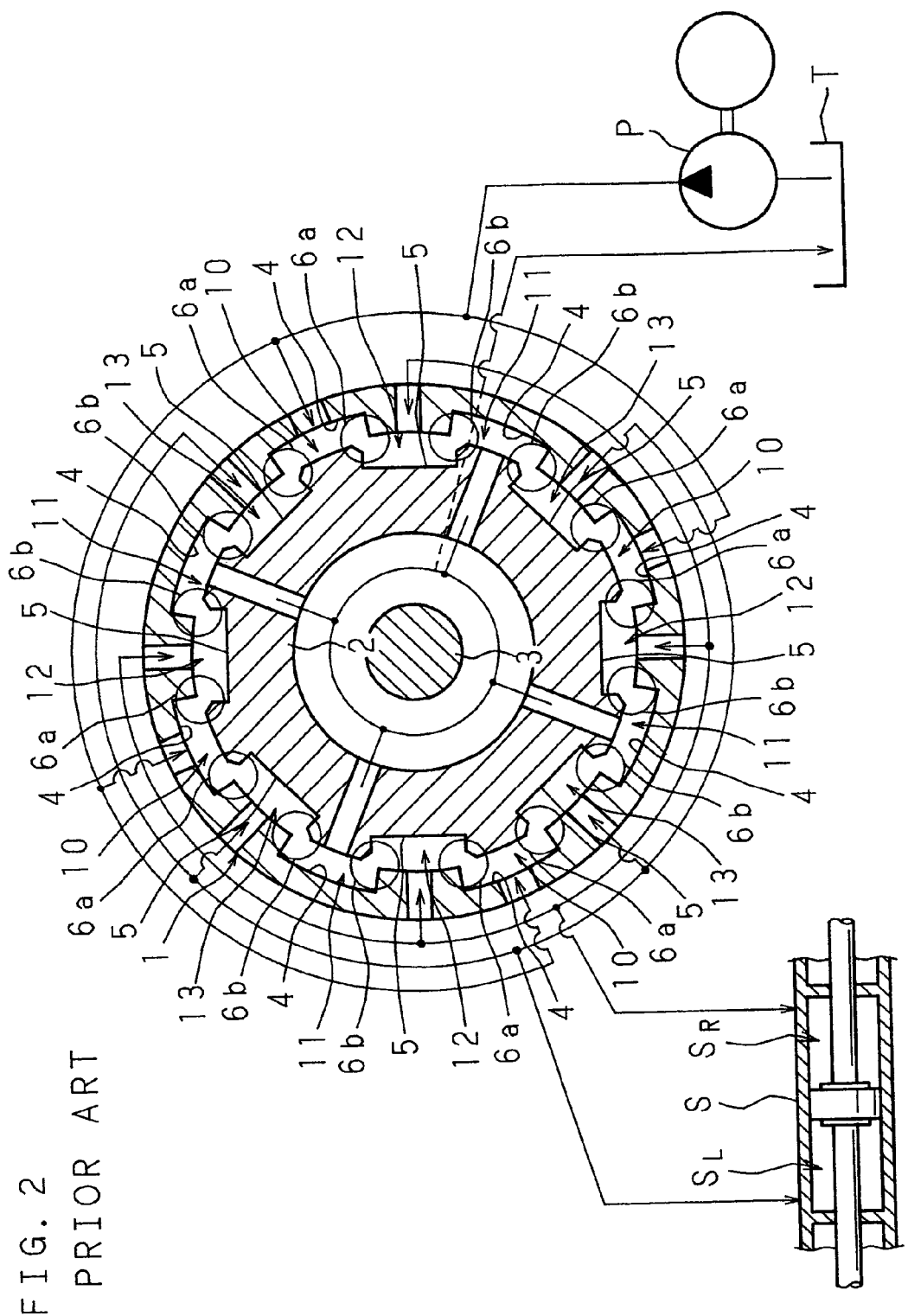
FIG. 2 is a schematic transverse sectional view showing another example of the structure of the conventional hydraulic control valve described in Japanese Patent Application Laid-open No. H9-39814 (1997)
Figure 4:
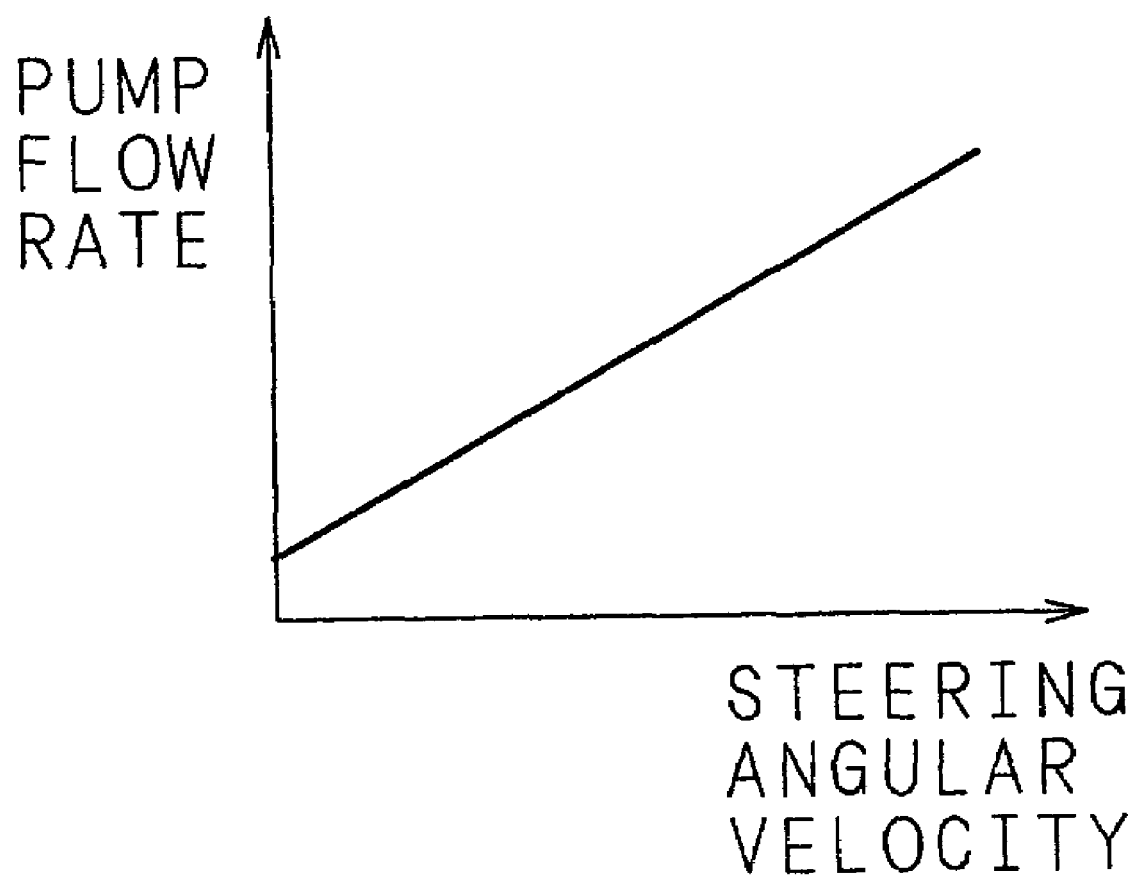
FIG. 4 is a view showing the flow rate characteristics of the conventional hydraulic control valve showing a relation between steering angular velocity and the flow rate of a pump.

This hydraulic control valve V of the second embodiment is basically the same as the conventional structure shown in FIG. 2. Corner portions of the second oil grooves 5, 5 facing the throttle portions 6b, 6b between the oil discharge chamber 11 and the first and second oil feed chambers 12, 13 are provided with the chamfer portions 7, 7 for adjusting the throttle area, and corner portions of the second oil grooves 5, 5 facing the throttle portions 6a, 6a between the oil supply chamber 10 and the first and second oil chambers 12, 13 are not provided with the chamfer portions for adjusting the throttle area. Therefore, the flow rate is controlled by the four throttle portions 6b, 6b, . . . provided with the chamfer portions 7, 7. Other structure and operation are the same as those of the first embodiment shown in FIGS. 7, 8A, and 8B, elements similar to those of the first embodiment are represented by the same reference numerals, and explanation of its detailed structure and operation will be omitted.

FIGS. 10A and 10B are explanatory views of operation of an oil feed chamber, an oil supply chamber, and an oil discharge chamber shown in straightly developed manner, which are arranged along a fitted peripheral surfaces of a valve body and a valve spool of the second embodiment in the hydraulic control valve of the present invention.

FIG. 10A shows a state (neutral state) in which the relative angular displacement is not generated between the valve body 1 and the valve spool 2. FIG. 10B shows a state in which the steering wheel is operated and the relative angular displacement is generated between the valve body 1 and the valve spool 2.

In the second embodiment, for example, when the relative rotation of the valve spool 2 with respect to the valve body 1 is generated in the clockwise direction in FIG. 9, the valve spool 2 relatively moves in the direction shown with the hollow arrow in FIG. 10B. At that time, in the second oil feed chamber 13, the throttle area of the throttle portion 6a of the oil supply chamber 10 is increased, and the throttle area of the throttle portion 6b of the oil discharge chamber 11 is controlled and reduced by the chamfer portion. On the other hand, in the first oil feed chamber 12, the throttle area of the throttle portion 6a of the oil supply chamber 10 is reduced without being controlled by the chamfer portion, and the throttle area of the throttle portion 6b of the oil discharge chamber 11 is increased.

Therefore, in the beginning of the steering operation, the flow rate is controlled by the chamfer portion 7 facing the throttle portions 6b between the oil discharge chamber 11 and the second oil feed chamber 13. On the other hand, the flow rate is not controlled in the throttle portion 6a between the oil supply chamber 10 and the first oil feed chamber 12 like the conventional example. That is, even through the eight oil grooves 4, 5 are disposed at equal distances, the number of portions where the flow rate is controlled can reduced to four which is the half similar to the first embodiment.

Here, the chamfer portions 7, 7 are disposed such as to face the pair of throttle portions 6b, 6b of the four first oil grooves 4 forming the oil discharge chamber 11 and with this design, the pressurized oil of the oil supply chamber 10 and the second oil feed chamber 13 flows from the second oil grooves 5 toward the first oil grooves 4 along the chamfer portions 7. Therefore, it is possible to gradually and straightly reduce the pressure of the operating oil flowing through the throttle portions 6b, 6b along the chamfer portions 7, 7, and to reduce the generation of cavitation as shown in the first embodiment.

THIRD EMBODIMENT

Figure 11A:
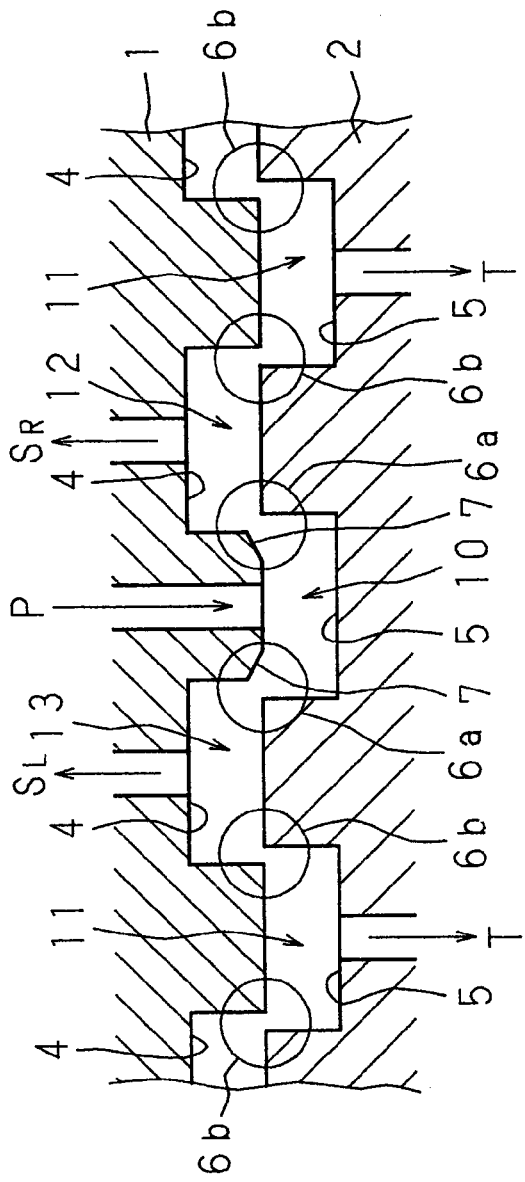
FIGS. 11A and 11B are explanatory views of operation of an oil feed chamber, an oil supply chamber, and an oil discharge chamber shown in straightly developed manner, which are arranged along a fitted peripheral surfaces of a valve body and a valve spool of the third embodiment in the hydraulic control valve of the present invention.
Figure 11B:
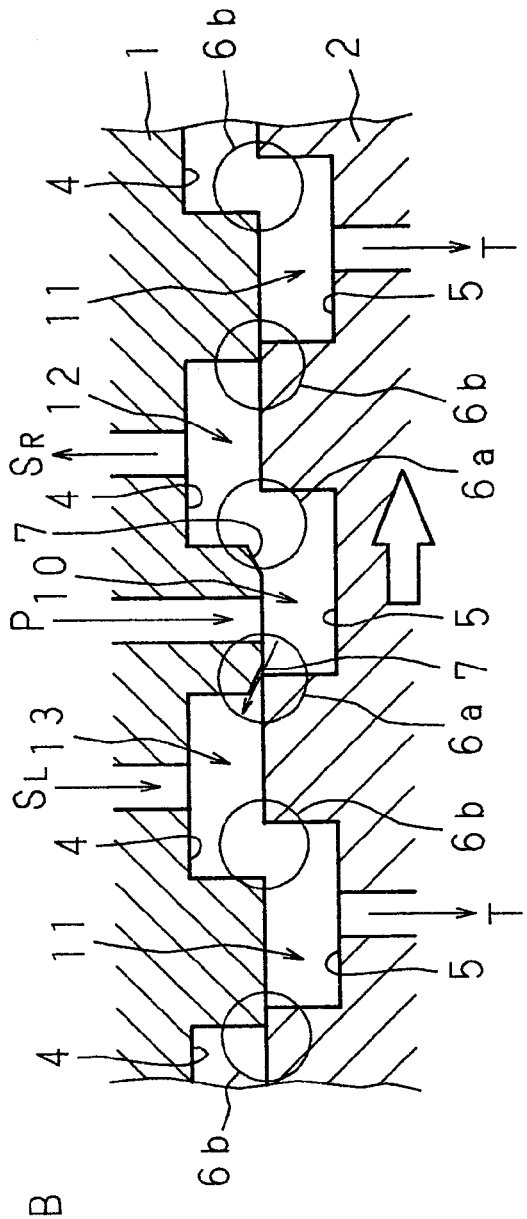

FIGS. 11A and 11B are explanatory views of operation of an oil feed chamber, an oil supply chamber, and an oil discharge chamber shown in straightly developed manner, which are arranged along a fitted peripheral surfaces of a valve body and a valve spool of the third embodiment in the hydraulic control valve of the present invention FIG. 11A shows a state (neutral state) in which the relative angular displacement is not generated between the valve body 1 and the valve spool 2. FIG. 11B shows a state in which the steering wheel is operated and the relative angular displacement is generated between the valve body 1 and the valve spool 2.

The hydraulic control valve of the third embodiment is basically the same as the first embodiment shown in FIGS. 7, 8A, and 8B. Corner portions of the first oil grooves 4 facing the throttle portions 6a, 6a between the oil supply chamber 10 and the first and second oil feed chambers 12, 13 are provided with the chamfer portions 7, 7 for adjusting the throttle areas, and corner portions of the first oil grooves 4, 4 facing the throttle portions 6b, 6b between the oil discharge chamber 11 and the first and second oil chambers 12, 13 are not provided with the chamfer portions for adjusting the throttle areas. Therefore, the flow rate is controlled by the four throttle portions 6a, 6a, . . . provided with the chamfer portions 7, 7. Other structure and operation are the same as those of the first embodiment shown in FIGS. 7, 8A, and 8B, elements similar to those of the first embodiment are represented by the same reference numerals, and explanation of its detailed structure and operation will be omitted.

FOURTH EMBODIMENT

Figure 12A:
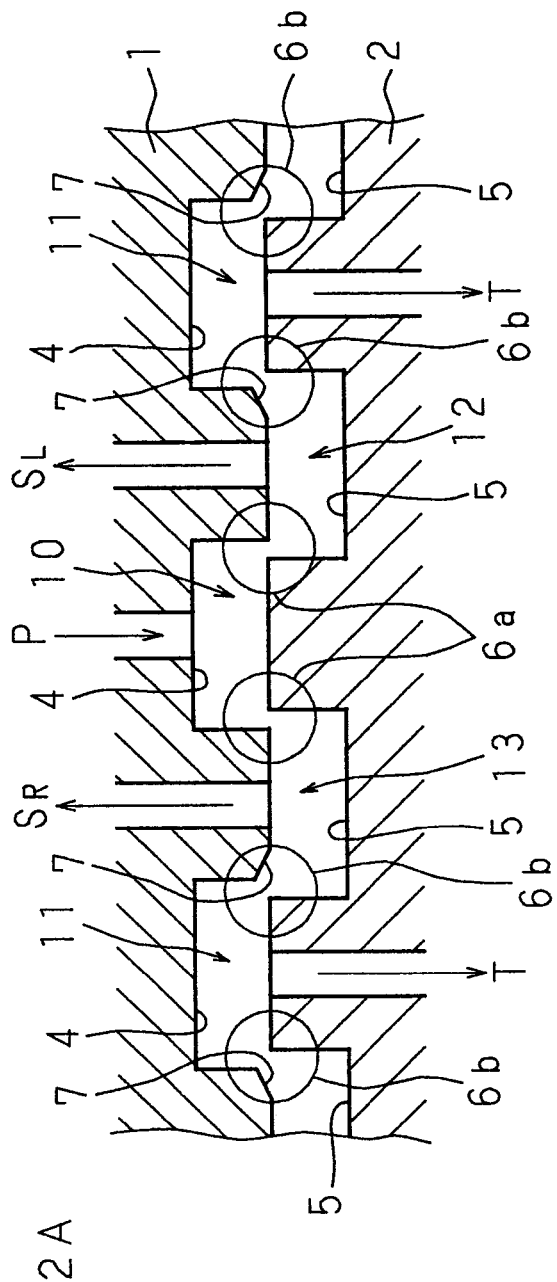
FIGS. 12A and 12B are explanatory views of operation of an oil feed chamber, an oil supply chamber, and an oil discharge chamber shown in straightly developed manner, which are arranged in a fitted peripheral surfaces of a valve body and a valve spool of the fourth embodiment in the hydraulic control valve of the present invention.
Figure 12B:
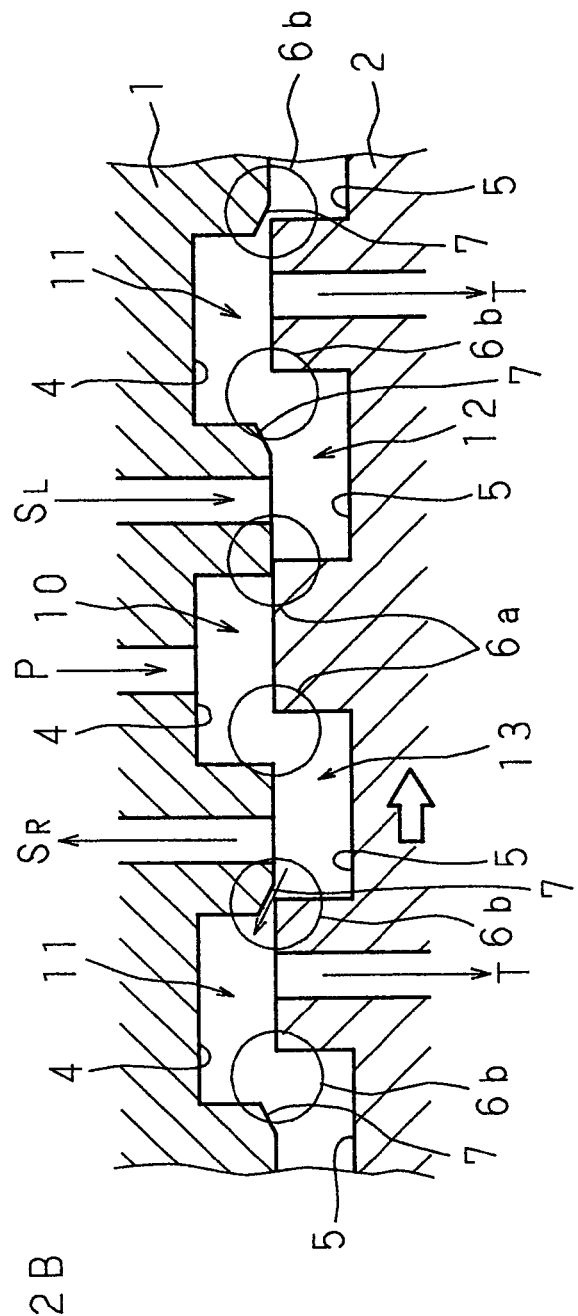

FIGS. 12A and 12B are explanatory views of operation of an oil feed chamber, an oil supply chamber, and an oil discharge chamber shown in straightly developed manner, which are arranged along a fitted peripheral surfaces of a valve body and a valve spool of the fourth embodiment in the hydraulic control valve of the present invention.

FIG. 12A shows a state (neutral state) in which the relative angular displacement is not generated between the valve body 1 and the valve spool 2. FIG. 12B shows a state in which the steering wheel is operated and the relative angular displacement is generated between the valve body 1 and the valve spool 2.

This hydraulic control valve of the fourth embodiment is basically the same as that of the second embodiment shown in FIGS. 9, 10A, and 10B. Corner portions of the first oil grooves 4 facing the throttle portions 6b, 6b between the oil discharge chamber 11 and the first and second oil chambers 12, 13 are provided with the chamfer portions 7, 7 for adjusting the throttle areas, and corner portions of the first oil grooves 4, 4 facing the throttle portions 6a, 6a between the oil supply chamber 10 and the first and second oil chambers 12, 13 are not provided with the chamfer portions for adjusting the throttle areas. Therefore, the flow rate is controlled by the four throttle portions 6b, 6b, . . . provided with the chamfer portions 7, 7. Other structure and operation are the same as those of the second embodiment shown in FIGS. 9, 10A, and 10B, elements similar to those of the second embodiment are represented by the same reference numerals, and explanation of its detailed structure and operation will be omitted.

Although the hydraulic control valve for controlling the oil pressure to be supplied to the hydraulic cylinder of the power steering apparatus has been described above in each of the embodiments, the present invention is not limited to this, and it is of course possible to apply the present invention to all rotary-type hydraulic control valve having a valve body and a valve spool fitted to each other, and provided around their fitting peripheral surfaces with a plurality of throttle portions whose throttle areas are changed in accordance with relative angular displacement between the valve body and the valve spool.

INDUSTRIAL APPLICABILITY

As described above in detail, according to the hydraulic control valve of the present invention, the chamfer portions are formed only on the throttle portions between the oil supply chambers and the oil feed chambers or on the throttle portions between the oil discharge chambers and the oil feed chambers, and the number of portion where the flow rate is controlled by the chamfer portions is reduced to half of the conventional structure. Therefore, even if the six or more oil grooves are disposed at equal distances from one another, the quantity of oil distributed to one portion where the flow rate is controlled when the minimum flow rate to be controlled is reduced as small as possible is doubled as compared with the conventional structure. Therefore, it is possible to stabilize the hydraulic characteristics in a region where the flow rate to be controlled is minimum, and to eliminate the discontinuity of the hydraulic characteristics.

Further, according to the hydraulic control valve of the present invention, the chamfer portion is formed only on the corner portion of one of the first and second oil groove, closer to the other one, facing the throttle portion where the oil flows from the second oil groove toward the first oil groove. Therefore, it is possible to flow the operating oil introduced into the oil supply chamber while gradually and straightly reducing the pressure of oil, from the second oil groove toward the first oil groove along the chamfer portion, and to reduce the cavitation which causes flowing noise of the operating oil generated when the relative angular displacement between the valve body and the valve spool is great.

Further, according to the power steering apparatus of the present invention using the above-described hydraulic control valve, the hydraulic characteristics in a region where the flow rate to be controlled is minimum is stable, and there is no discontinuity of the hydraulic characteristics. That is, even if a hydraulic control valve having six or more oil grooves disposed at equal distances from one another is used, the discontinuity is not generated in the steering torque, and it is possible to stop the operation of the electric motor or to drive the motor at extremely low speed. Therefore, it is possible to inexpensively produce a power steering apparatus having a hydraulic control valve capable of reducing the energy consumption while the steering operation is not conducted, e.g., at the time of idling. Further, it is possible to reduce the cavitation which causes flowing noise.

Furthermore, according to the power steering apparatus of the present invention, it is possible to realize a power steering apparatus in which the flow rate of the hydraulic pump is increased based on the steering angular velocity, and even when the flow rate to be controlled of the above-mentioned hydraulic control valve is abruptly changed to high flow rate from low flow rate or zero flow rate which is lower than the conventional minimum flow rate to be controlled, the hydraulic characteristics in a region where the flow rate to be controlled is minimum is stable, and there is no discontinuity of the hydraulic characteristics.

The invention claimed is:

1. A hydraulic control valve comprising:
a valve body, including a plurality of valve body lands; and
a valve spool, fitted into said valve body so as to be changeable in relative angle, said valve spool including a plurality of valve spool lands;
wherein said valve body includes pairs of chamfers which are so formed that each of the valve body lands has only one chamfer.

2. The hydraulic control valve according to claim 1, wherein the pairs of chamfers are comprised of adjacent valve body lands, each having a single chamfer provided on an alternate corner from each adjacent valve body land.

3. The hydraulic control valve according to claim 1, wherein alternating pairs of chamfers are on the same valve spool posts.

4. A power steering apparatus, comprising;
a hydraulic pump, being driven by an electric motor for supplying oil pressure to a hydraulic cylinder for steering assistance; and
a hydraulic control valve, interposed in a hydraulic pressure path between said hydraulic pump and hydraulic cylinder, for controlling oil pressure from said hydraulic pump to two cylinder chambers included in said hydraulic cylinder, wherein said hydraulic control valve is the hydraulic control valve described in claim 3.

5. A power steering apparatus, comprising;
a hydraulic pump, being driven by an electric motor, for supplying oil pressure to a hydraulic cylinder; and a hydraulic control valve, for controlling oil pressure from said hydraulic pump to cylinder chambers included in said hydraulic cylinder, said hydraulic control valve comprising:

a valve body, including a plurality of valve body posts;

a valve spool, fitted into said valve body so as to be changeable in relative angle, said valve spool including a plurality of valve spool posts;

chamfers, wherein said chamfers are the chamfers of claim 3.

6. The hydraulic control valve according to claim 1, wherein alternating pairs of chamfers are on the same valve body posts.

7. A power steering apparatus, comprising;

a hydraulic pump, being driven by an electric motor for supplying oil pressure to a hydraulic cylinder for steering assistance; and a hydraulic control valve, interposed in a hydraulic pressure path between said hydraulic pump and hydraulic cylinder, for controlling oil pressure from said hydraulic pump to two cylinder chambers included in said hydraulic cylinder, wherein said hydraulic control valve is the hydraulic control valve described in claim 6.

8. A power steering apparatus, comprising;

a hydraulic pump, being driven by an electric motor, for supplying oil pressure to a hydraulic cylinder; and a hydraulic control valve, for controlling oil pressure from said hydraulic pump to cylinder chambers included in said hydraulic cylinder, said hydraulic control valve comprising:

a valve body, including a plurality of valve body posts;

a valve spool, fitted into said valve body so as to be changeable in relative angle, said valve spool including a plurality of valve spool posts;

chamfers, wherein said chamfers are the chamfers of claim 6.

9. The hydraulic control valve according to claim 1, wherein alternating pairs of chamfers are on consecutive valve body lands.

10. The hydraulic control valve according to claim 1, wherein said valve body includes a plurality of first oil grooves formed between said valve body lands.

11. The hydraulic control valve according to claim 10, wherein said valve spooi includes a plurality of second oil grooves formed between said valve spool lands.

12. The hydraulic control valve according to claim 11, wherein gaps between said first and second oil grooves, which are adjacent in the peripheral direction act as throttle portions which change throttle areas in accordance with a relative angular displacement between said valve body and valve spool.

13. The hydraulic control valve according to claim 11, wherein ones of said first and second oil grooves alternately act as oil supply chambers and oil discharge chambers, and the others of said first and second oil grooves acting as oil feed chambers interposed between said oil supply chambers and oil discharge chambers.

14. The hydraulic control valve according to claim 1, wherein chamfers adjust a throttle area.

15. A power steering apparatus, comprising:

a hydraulic pump, being driven by an electric motor for supplying oil pressure to a hydraulic cylinder for steering assistance; and a hydraulic control valve, interposed in a hydraulic pressure path between said hydraulic pump and hydraulic cylinder, for controlling oil pressure from said hydraulic pump to two cylinder chambers included in said hydraulic cylinder, said hydraulic control valve comprising:

a valve body, including a plurality of valve body lands; and a valve spool, fitted into said valve body so as to be changeable in relative angle, said valve spool including a plurality of valve spool lands;

wherein said valve body includes pairs of chamfers which are so formed that each of the valve body lands has only one chamfer.

16. The power steering apparatus according to claim 15, wherein the pairs of chamfers are comprised of adjacent valve body lands, each having a single chamfer provided on an alternate corner from each adjacent valve body land.

17. The power steering apparatus according to claim 15, wherein said hydraulic pump is driven such that a flow rate becomes low flow rate or zero flow rate when steering is not carried out, and such that the flow rate becomes high in accordance with steering angular velocity when steering is carried out, and said valve body includes a plurality of first oil grooves formed between said valve body lands.

18. The power steering apparatus according to claim 17, wherein said valve spooi includes a plurality of second oil grooves formed between said valve spool lands.

19. The power steering apparatus according to claim 18, wherein gaps between said first and second oil grooves, which are adjacent in the peripheral direction act as throttle portions which change throttle areas in accordance with a relative angular displacement between said valve body and valve spool.

20. The power steering apparatus according to claim 18, wherein ones of said first and second oil grooves alternately act as oil supply chambers and oil discharge chambers, and the others of said first and second oil grooves acting as oil feed chambers interposed between said oil supply chambers and oil discharge chambers.

21. The power steering apparatus according to claim 15, wherein said hydraulic pump is driven such that a flow rate becomes a low flow rate or zero flow rate when steering is not carried out, and such that the flow rate becomes high in accordance with steering angular velocity when steering is carried out, and chamfers adjust throttle area.

22. The power steering apparatus according to claim 15, wherein said electric motor drives said hydraulic pump such that oil pressure is supplied at zero flow rate or predetermined small flow rate as small as possible when steering is not carried out, and such that the oil pressure is abruptly supplied at high flow rate in accordance with the steering angular velocity at the steering is carried out, and said valve body includes a plurality of first oil grooves formed between said valve body lands.

23. The power steering apparatus according to claim 22, wherein said valve spool includes a plurality of second oil grooves formed between said valve spool lands.

24. The power steering apparatus according to claim 23, wherein gaps between said first and second oil grooves, which are adjacent in the peripheral direction act as throttle portions which change throffle areas in accordance with a relative angular displacement between said valve body and valve spool.

25. The power steering apparatus according to claim 23, wherein ones of said first and second oil grooves alternately act as oil supply chambers and oil discharge chambers, and the others of said first and second oil grooves acting as oil feed chambers interposed between said oil supply chambers and oil discharge chambers.

26. The power steering apparatus according to claim 15, wherein
said electric motor drives said hydraulic pump such that oil pressure is supplied at zero flow rate or predetermined small flow rate as small as possible when steering is not carried out, and such that the oil pressure is abruptly supplied at high flow rate in accordance with the steering angular velocity at the steering is carried out, and chamfers adjust throttle area.

27. A power steering apparatus, comprising;
a hydraulic pump, being driven by an electric motor for supplying oil pressure to a hydraulic cylinder for steering assistance; and
a hydraulic control valve, interposed in a hydraulic pressure path between said hydraulic pump and hydraulic cylinder, for controlling oil pressure from said hydraulic pump to two cylinder chambers included in said hydraulic cylinder, wherein said hydraulic control valve is the hydraulic control valve described in claim 15,
wherein alternating pairs of chamfers are consecutive valve body lands.

28. A power steering apparatus, comprising;
a hydraulic pump, being driven by an electric motor, for supplying oil pressure to a hydraulic cylinder; and
a hydraulic control valve, for controlling oil pressure from said hydraulic pump to cylinder chambers included in said hydraulic cylinder,
said hydraulic control valve comprising:
a valve body, including a plurality of valve body lands;
a valve spool, fitted into said valve body so as to be changeable in relative angle, said valve spool including a plurality of valve spool lands;
wherein said valve body includes pairs of chamfers which are so formed that each of the valve body lands has only one chamfer, and wherein alternating pairs of chamfers are on consecutive valve body lands.

* * * * *